United States Patent
Li et al.

(10) Patent No.: US 10,932,287 B2
(45) Date of Patent: Feb. 23, 2021

(54) DYNAMIC MONITORING AND SCHEDULING IN RETRANSMISSION

(71) Applicant: QUALCOMM Incorporated, San Diego, CA (US)

(72) Inventors: Junyi Li, Chester, NJ (US); Rajat Prakash, San Diego, CA (US); Chong Li, Weehawken, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/278,281

(22) Filed: Feb. 18, 2019

(65) Prior Publication Data
US 2019/0261394 A1     Aug. 22, 2019

Related U.S. Application Data

(60) Provisional application No. 62/633,048, filed on Feb. 20, 2018.

(51) Int. Cl.
*H04W 72/12* (2009.01)
*H04W 72/04* (2009.01)
(Continued)

(52) U.S. Cl.
CPC ........... *H04W 72/1263* (2013.01); *H04L 1/08* (2013.01); *H04L 1/1825* (2013.01);
(Continued)

(58) Field of Classification Search
None
See application file for complete search history.

(56) References Cited

U.S. PATENT DOCUMENTS 8,934,405 B2  1/2015  Rosenqvist et al.
2009/0279480 A1*  11/2009  Rosenqvist ........... H04L 1/1887
                                             370/328

(Continued)

OTHER PUBLICATIONS

Huawei, et al., "On Bandwidth Adaptation", 3GPP TSG-RAN WG1 NR Ad-Hoc Meeting, 3GPP Draft; R1-1711424, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017 (Jun. 26, 2017), 5 Pages, XP051300612, Retrieved from the Internet: URL: http://www.3gpp.org/ftp/Meetings_3GPP_SYNC/RAN1/Docs/ [retrieved on Jun. 26, 2017] Proposal 5.

(Continued)

*Primary Examiner* — Saumit Shah
(74) *Attorney, Agent, or Firm* — Kevin M. Donnelly

(57) ABSTRACT

Methods, systems, and devices for dynamic monitoring and scheduling in retransmission are described for wireless communications. For example, a receiving device may receive a data transmission in a first receiver bandwidth, determine that a data packet of the data transmission was unsuccessfully decoded, switch to a second receiver bandwidth that is wider than the first receiver bandwidth or narrower than the first receiver bandwidth (e.g., based on determining that the data packet was unsuccessfully decoded), and receive a retransmission of the data packet in the second receiver bandwidth. In another example, a transmitting device may schedule a data transmission according to a first receiver bandwidth, receive an indication that a data packet of the data transmission was unsuccessfully decoded, and schedule a retransmission of the data packet according to a second receiver bandwidth that is wider than the first receiver bandwidth or narrower than the first receiver bandwidth.

31 Claims, 16 Drawing Sheets

(51) Int. Cl.
    *H04L 1/08*      (2006.01)
    *H04L 1/18*      (2006.01)

(52) U.S. Cl.
    CPC ....... *H04L 1/1893* (2013.01); *H04W 72/0453* (2013.01); *H04W 72/1289* (2013.01)

(56) References Cited

U.S. PATENT DOCUMENTS

| | | | |
|---|---|---|---|
| 2012/0069796 A1 | 3/2012 | Casaccia et al. | |
| 2013/0251013 A1* | 9/2013 | Banister | H04L 1/0054 375/224 |
| 2017/0041984 A1* | 2/2017 | Agrawal | H04L 47/34 |
| 2017/0214493 A1 | 7/2017 | Hampel et al. | |
| 2019/0253192 A1* | 8/2019 | Zhou | H04L 1/1896 |
| 2019/0313438 A1* | 10/2019 | Zhang | H04L 1/1829 |
| 2020/0044786 A1* | 2/2020 | Medles | H04L 5/0055 |

OTHER PUBLICATIONS

International Search Report and Written Opinion—PCT/US2019/018486—ISA/EPO—dated May 22, 2019.

\* cited by examiner

DYNAMIC MONITORING AND SCHEDULING IN RETRANSMISSION

CROSS REFERENCES

The present Application for Patent claims benefit of U.S. Provisional Patent Application No. 62/633,048 by LI et al., entitled "DYNAMIC MONITORING AND SCHEDULING IN RETRANSMISSION," filed Feb. 20, 2018, assigned to the assignee hereof, and expressly incorporated by reference in its entirety.

BACKGROUND

The following relates generally to wireless communications, and more specifically to dynamic monitoring and scheduling in retransmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), orthogonal frequency-division multiplexing (OFDM), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

A receiving device may monitor a frequency spectrum according to a particular receiver bandwidth for a data transmission. However, monitoring according to a particular receiver bandwidth may limit scheduling flexibility and power management with regard to a transmission of a data packet and a subsequent retransmission of the initial transmission of the data packet was unsuccessfully decoded.

SUMMARY

The described techniques relate to improved methods, systems, devices, and apparatuses that support dynamic monitoring and scheduling in retransmission.

In accordance with aspects of the present disclosure, a receiving device may support monitoring a frequency spectrum using different receiver bandwidths for an initial transmission and a subsequent retransmission (e.g., in the event that the initial transmission was unsuccessfully decoded). Likewise, a transmitting device may support scheduling and transmitting data transmissions using a frequency spectrum according to different receiver bandwidths for an initial transmission and a subsequent retransmission (e.g., in the event that the initial transmission was unsuccessfully decoded).

For example, when a receiving device receives an indication of a data packet for the receiving device, the receiving device may subsequently attempt to receive and decode the indicated data packet. If the receiving device successfully receives and decodes the indicated data packet, the receiving device may transmit an acknowledgment (ACK) to the transmitting device, and may continue to monitor the frequency spectrum according to the first receiver bandwidth. Likewise, the transmitting device may continue to schedule data transmissions to be transmitted using the first bandwidth part.

If the receiving device does not successfully receive and decode an indicated data packet, the receiving device may transmit a negative acknowledgment (NACK), and switch to monitoring the frequency spectrum according to a second receiver bandwidth, which may span a wider frequency range than the first receiver bandwidth or a narrower frequency range than the first receiver bandwidth. The transmitting device may schedule one or more retransmissions of the unsuccessfully decoded data packet according to the second receiver bandwidth. In other words, the transmitting device may schedule retransmissions of the data packet(s) by selecting from a range of a frequency spectrum that is wider than or narrower than a range of a frequency spectrum from which resources were selected for the initial transmission.

A method for wireless communications is described. The method may include monitoring a first receiver bandwidth for downlink transmissions to a user equipment (UE), receiving, at the UE, a data transmission in the first receiver bandwidth, determining, at the UE, that a data packet of the data transmission was unsuccessfully decoded, switching, at the UE, to monitor a second receiver bandwidth that is wider than the first receiver bandwidth or narrower than the first receiver bandwidth, the switching based at least in part on determining that the data packet was unsuccessfully decoded, and receiving, at the UE, a retransmission of the data packet in the second receiver bandwidth.

An apparatus for wireless communications is described. The apparatus may include a processor, memory in electronic communication with the processor, and instructions stored in the memory. The instructions may be executable by the processor to cause the apparatus to monitor a first receiver bandwidth for downlink transmissions, receive a data transmission in the first receiver bandwidth, determine that a data packet of the data transmission was unsuccessfully decoded, switch to monitor a second receiver bandwidth that is wider than the first receiver bandwidth or narrower than the first receiver bandwidth, the switching based at least in part on determining that the data packet was unsuccessfully decoded, and receive a retransmission of the data packet in the second receiver bandwidth.

Another apparatus for wireless communications is described. The apparatus may include means for monitoring a first receiver bandwidth for downlink transmissions, means for receiving a data transmission in the first receiver bandwidth, means for determining that a data packet of the data transmission was unsuccessfully decoded, means for switching to monitor a second receiver bandwidth that is wider than the first receiver bandwidth or narrower than the first receiver bandwidth, the switching based at least in part on determining that the data packet was unsuccessfully decoded, and means for receiving a retransmission of the data packet in the second receiver bandwidth.

A non-transitory computer-readable medium storing code for wireless communications is described. The code may include instructions executable by a processor to monitor a first receiver bandwidth for downlink transmissions to a UE, receive, at the UE, a data transmission in the first receiver bandwidth, determine, at the UE, that a data packet of the data transmission was unsuccessfully decoded, switch, at the UE, to monitor a second receiver bandwidth that is wider than the first receiver bandwidth or narrower than the first receiver bandwidth, the switching based at least in part on determining that the data packet was unsuccessfully decoded, and receive, at the UE, a retransmission of the data packet in the second receiver bandwidth.

Some examples of the method, apparatuses, and non-transitory computer-readable medium may further include operations, features, means, or instructions for receiving a configuration message designating the second receiver bandwidth for retransmissions of data, wherein switching to monitor the second receiver bandwidth is based at least in part on the configuration message.

In some examples of the method, apparatuses, and non-transitory computer-readable medium, the second receiver bandwidth may be wider than the first receiver bandwidth.

In some examples of the method, apparatuses, and non-transitory computer-readable medium, receiving the data transmission may include operations, features, means, or instructions for receiving over a first bandwidth part. In some examples of the method, apparatuses, and non-transitory computer-readable medium, switching to monitor the second receiver bandwidth may include operations, features, means, or instructions for switching from the first bandwidth part to monitor one or more different bandwidth parts, wherein the one or more different bandwidth parts may be non-overlapping with the first bandwidth part in the frequency domain.

Some examples of the method, apparatus, and non-transitory computer-readable medium may further include operations, features, means, or instructions for determining (e.g., at the UE), that the retransmission of the data packet was successfully decoded, switching to monitor the first receiver bandwidth based at least in part on determining that the retransmission of the data packet was successfully decoded, and receiving a subsequent data transmission in the first receiver bandwidth.

In some examples of the method, apparatuses, and non-transitory computer-readable medium, receiving the data transmission may include operations, features, means, or instructions for receiving the data transmission on a first bandwidth part. In some examples of the method, apparatuses, and non-transitory computer-readable medium, receiving the subsequent data transmission may include operations, features, means, or instructions for receiving the subsequent data transmission on the first bandwidth part.

In some examples of the method, apparatuses, and non-transitory computer-readable medium, receiving the retransmission of the data packet may include operations, features, means, or instructions for receiving the retransmission of the data packet on a second bandwidth part. In some examples of the method, apparatuses, and non-transitory computer-readable medium, receiving the subsequent data transmission may include operations, features, means, or instructions for receiving the subsequent data transmission on the second bandwidth part based at least in part on determining that the retransmission of the data packet received on the second bandwidth part was successfully decoded.

Some examples of the method, apparatuses, and non-transitory computer-readable medium may further include operations, features, means, or instructions for receiving an indication of a second bandwidth part for receiving the subsequent data transmission, wherein receiving the subsequent data transmission includes receiving the subsequent data transmission on the second bandwidth part.

Some examples of the method, apparatuses, and non-transitory computer-readable medium may further include operations, features, means, or instructions for receiving an indication of a first bandwidth part for receiving the data transmission, wherein receiving in the first receiver bandwidth may be based at least in part on the indicated first bandwidth part.

In some examples of the method, apparatuses, and non-transitory computer-readable medium, receiving in the first receiver bandwidth (e.g., receiving the data transmission) may include operations, features, means, or instructions for using a first receiving component having a first bandwidth. In some examples of the method, apparatuses, and non-transitory computer-readable medium, switching to monitor the second receiver bandwidth may include operations, features, means, or instructions for switching from the first receiving component to a second receiving component having a second bandwidth that is wider than the first bandwidth based at least in part on determining that the data packet was unsuccessfully decoded.

In some examples of the method, apparatuses, and non-transitory computer-readable medium, receiving in the first receiver bandwidth (e.g., receiving the data transmission) may include operations, features, means, or instructions for using a first receiver chain having a first bandwidth. In some examples of the method, apparatuses, and non-transitory computer-readable medium, switching to monitor the second receiver bandwidth may include operations, features, means, or instructions for switching from the first receiver chain to a second receiver chain having a second bandwidth that is wider than the first bandwidth based at least in part on determining that the data packet was unsuccessfully decoded.

In some examples of the method, apparatuses, and non-transitory computer-readable medium, receiving in the first receiver bandwidth (e.g., receiving the data transmission) may include operations, features, means, or instructions for processing received signals according to a first processing bandwidth. In some examples of the method, apparatuses, and non-transitory computer-readable medium, switching to monitor the second receiver bandwidth may include operations, features, means, or instructions for switching from the first processing bandwidth to monitor a second processing bandwidth that is wider than the first processing bandwidth based at least in part on determining that the data packet was unsuccessfully decoded.

A method for wireless communications is described. The method may include scheduling a data transmission for a UE according to a first receiver bandwidth, receiving an indication that a data packet of the data transmission was unsuccessfully decoded by the UE, and scheduling a retransmission of the data packet to the UE, based at least in part on the indication that the data packet was unsuccessfully decoded, according to a second receiver bandwidth that is wider than the first receiver bandwidth or narrower than the first receiver bandwidth.

An apparatus for wireless communications is described. The apparatus may include a processor, memory in electronic communication with the processor, and instructions stored in the memory. The instructions may be executable by the processor to cause the apparatus to schedule a data transmission for a UE according to a first receiver bandwidth, receive an indication that a data packet of the data transmission was unsuccessfully decoded by the UE, and schedule a retransmission of the data packet to the UE, based at least in part on the indication that the data packet was unsuccessfully decoded, according to a second receiver bandwidth that is wider than the first receiver bandwidth or narrower than the first receiver bandwidth.

Another apparatus for wireless communications is described. The apparatus may include means for scheduling a data transmission for a UE according to a first receiver bandwidth, means for receiving an indication that a data packet of the data transmission was unsuccessfully decoded by the UE, and means for scheduling a retransmission of the data packet to the UE, based at least in part on the indication that the data packet was unsuccessfully decoded, according to a second receiver bandwidth that is wider than the first receiver bandwidth or narrower than the first receiver bandwidth.

A non-transitory computer-readable medium storing code for wireless communications is described. The code may include instructions executable by a processor to schedule a data transmission for a UE according to a first receiver bandwidth, receive an indication that a data packet of the data transmission was unsuccessfully decoded by the UE, and schedule a retransmission of the data packet to the UE, based at least in part on the indication that the data packet was unsuccessfully decoded, according to a second receiver bandwidth that is wider than the first receiver bandwidth or narrower than the first receiver bandwidth.

Some examples of the method, apparatuses, and non-transitory computer-readable medium may further include operations, features, means, or instructions for transmitting a configuration message to the UE designating the second receiver bandwidth for retransmissions of data.

In some examples of the method, apparatuses, and non-transitory computer-readable medium, the second receiver bandwidth may be wider than the first receiver bandwidth.

Some examples of the method, apparatuses, and non-transitory computer-readable medium may further include operations, features, means, or instructions for receiving an indication that the retransmission of the data packet was successfully decoded by the UE and scheduling a subsequent data transmission for the UE, based at least in part on the indication that the retransmission of the data packet was successfully decoded, according to the first receiver bandwidth.

In some examples of the method, apparatuses, and non-transitory computer-readable medium, receiving the indication that the retransmission of the data packet was successfully decoded indicates that the retransmission of the data packet was received on a second bandwidth part. In some examples of the method, apparatuses, and non-transitory computer-readable medium, scheduling the subsequent data transmission according to the first receiver bandwidth may include operations, features, means, or instructions for scheduling the subsequent data transmission to be transmitted on the second bandwidth part based at least in part on the received indication that the retransmission of the data packet was successfully decoded.

In some examples of the method, apparatuses, and non-transitory computer-readable medium, scheduling the data transmission according to the first receiver bandwidth may include operations, features, means, or instructions for scheduling the data transmission to be transmitted on first bandwidth part. In some examples of the method, apparatuses, and non-transitory computer-readable medium, scheduling the subsequent data transmission according to the first receiver bandwidth may include operations, features, means, or instructions for scheduling the subsequent data transmission to be transmitted on the first bandwidth part.

Some examples of the method, apparatuses, and non-transitory computer-readable medium may further include operations, features, means, or instructions for transmitting an indication of a second bandwidth part for the UE to receive the subsequent data transmission.

In some examples of the method, apparatuses, and non-transitory computer-readable medium, scheduling the data transmission according to the first receiver bandwidth may include operations, features, means, or instructions for scheduling the data transmission on a first bandwidth part.

In some examples of the method, apparatuses, and non-transitory computer-readable medium, scheduling the retransmission of the data packet according to the second receiver bandwidth may include operations, features, means, or instructions for scheduling the retransmission of the data packet on a second bandwidth part that may be different from the first bandwidth part based at least in part on the indication that the data packet was unsuccessfully decoded.

In some examples of the method, apparatuses, and non-transitory computer-readable medium, scheduling the retransmission of the data packet according to the second receiver bandwidth may include operations, features, means, or instructions for scheduling the retransmission of the data packet on two or more bandwidth parts based at least in part on the indication that the data packet was unsuccessfully decoded.

In some examples of the method, apparatuses, and non-transitory computer-readable medium, scheduling the retransmission of the data packet according to the second receiver bandwidth may include operations, features, means, or instructions for identifying a plurality of bandwidth parts, selecting one or more of the identified plurality of bandwidth parts for the retransmission of the data packet, and scheduling the retransmission of the data packet on the selected one of more of the identified plurality of bandwidth parts.

In some examples of the method, apparatuses, and non-transitory computer-readable medium, the identified plurality of bandwidth parts may be non-overlapping with the first bandwidth part in the frequency domain.

Some examples of the method, apparatuses, and non-transitory computer-readable medium may further include operations, features, means, or instructions for transmitting an indication of the first bandwidth part for the UE to receive the data transmission.

In some examples of the method, apparatuses, and non-transitory computer-readable medium, scheduling the data transmission according to the first receiver bandwidth may include operations, features, means, or instructions for scheduling the data transmission to be transmitted from a first transmit and receive point (TRP). In some examples of the method, apparatuses, and non-transitory computer-readable medium, scheduling the retransmission of the data packet according to the second receiver bandwidth may include operations, features, means, or instructions for scheduling the retransmission of the data packet to be transmitted from a second TRP that may be different from the first TRP based at least in part on the indication that the data packet was unsuccessfully decoded.

Although some aspects of dynamic monitoring and scheduling in retransmission are described in the context of a base station being an example of a transmitting device and a UE being an example of a receiving device, various other examples are possible in accordance with the present disclosure. In another example, a UE may perform the operations described in the context of a transmitting device, and a base station may perform the operations described in the context of a receiving device (e.g., for dynamic monitoring and scheduling for uplink transmission and retransmission). In another example, a first UE may perform the operations described in the context of a transmitting device, and a second UE (e.g., a different UE) may perform the operations described in the context of a receiving device (e.g., for dynamic monitoring and scheduling for peer-to-peer or device-to-device transmission and retransmission). In various examples, the same device may perform the operations described in the context of a transmitting device (e.g., for a first communications stream, such as uplink communications) as well as the operations described in the context of a receiving device (e.g., for a second communications stream, such as a downlink communications).

DETAILED DESCRIPTION

Figure 1:
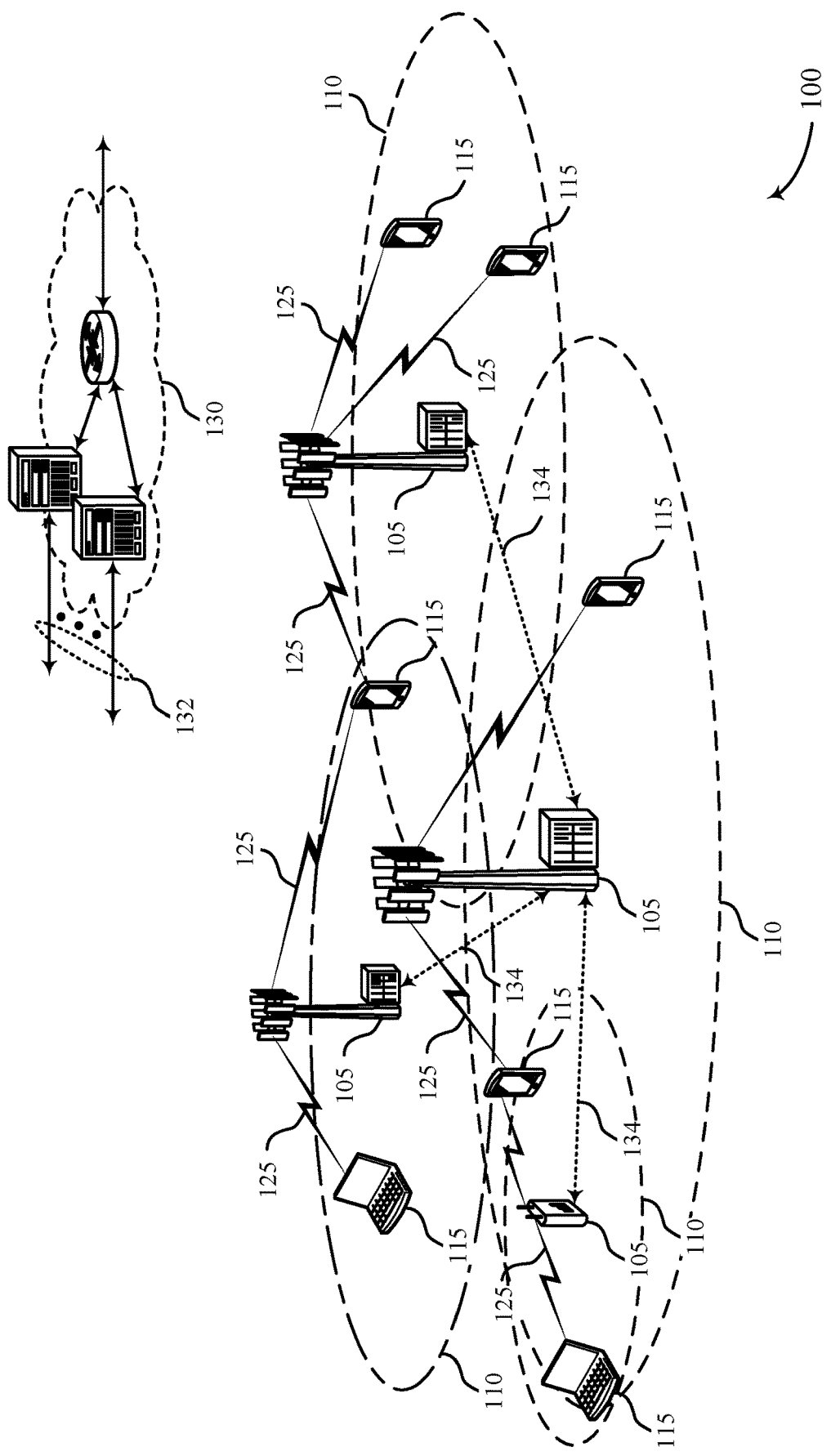
FIG. 1 illustrates an example of a wireless communications system that supports dynamic monitoring and scheduling in retransmission in accordance with aspects of the present disclosure.

In accordance with aspects of the present disclosure, a receiving device may support monitoring a frequency spectrum using different receiver bandwidths for an initial transmission and a subsequent retransmission (e.g., in the event that the initial transmission was unsuccessfully decoded). Likewise, a transmitting device may support scheduling and transmitting data transmissions using a frequency spectrum according to different receiver bandwidths for an initial transmission and a subsequent retransmission (e.g., in the event that the initial transmission was unsuccessfully decoded).

For example, when a receiving device receives an indication of a data packet for the receiving device, the receiving device may subsequently attempt to receive and decode the indicated data packet. If the receiving device successfully receives and decodes the indicated data packet, the receiving device may transmit an acknowledgment (ACK) to the transmitting device, and may continue to monitor the frequency spectrum according to the first receiver bandwidth. Likewise, the transmitting device may continue to schedule data transmissions to be transmitted using the first bandwidth part.

If the receiving device does not successfully receive and decode an indicated data packet, the receiving device may transmit a negative acknowledgment (NACK), and switch to monitoring the frequency spectrum according to a second receiver bandwidth, which may span a wider frequency range than the first receiver bandwidth or a narrower frequency range than the first receiver bandwidth. The transmitting device may schedule one or more retransmissions of the unsuccessfully decoded data packet according to the second receiver bandwidth. In other words, the transmitting device may schedule retransmissions of the data packet(s) by selecting from a range of a frequency spectrum that is wider than or narrower than a range of a frequency spectrum from which resources were selected for the initial transmission.

In one example, a transmitting device may schedule and transmit an initial data transmission according to a relatively narrow receiver bandwidth. A receiving device may monitor for and receive the initial data transmission using the relatively narrow receiver bandwidth. If the receiving device does not successfully receive and decode a data packet, the receiving device may send a NACK associated with the data packet, and switch to monitoring according to a relatively wide receiver bandwidth. For a retransmission, the transmitting device may select from resources of a second bandwidth part that is wider than a first bandwidth part used for the initial transmission. This selection from resources of a wider bandwidth may correspond to a wider frequency bandwidth being monitored by a receiving device for the retransmission (e.g., according to the relatively wide receiver bandwidth). In some examples, such a selection of resources for a retransmission according to a wider receiver bandwidth which may improve flexibility for scheduling a retransmission of a data packet.

If the receiving device successfully receives and decodes a retransmitted data packet, the receiving device may transmit an ACK for the retransmitted data packet, and switch back to monitoring the frequency spectrum using the relatively narrow receiver bandwidth. In some examples, returning to a narrower receiver bandwidth may reduce power consumption at the receiving device (e.g., as compared with a power consumption when using the relatively wide receiver bandwidth). The transmitting device may switch to scheduling subsequent data transmissions according to the relatively narrow receiver bandwidth. Thus, in accordance with the described techniques, dynamic monitoring and scheduling in retransmission may be employed to balance considerations related to retransmission scheduling flexibility at a transmitting device and power consumption at a receiving device.

Aspects of the disclosure are initially described in the context of wireless communications systems. Aspects of the disclosure are further illustrated by example communications and example communications sequences that support dynamic monitoring and scheduling in retransmission. Aspects of the disclosure are further illustrated by and described with reference to apparatus diagrams, system diagrams, and flowcharts that relate to dynamic monitoring and scheduling in retransmission.

FIG. 1 illustrates an example of a wireless communications system 100 that supports dynamic monitoring and scheduling in retransmission in accordance with aspects of the present disclosure. The wireless communications system 100 includes base stations 105, user equipment (UEs) 115, and a core network 130. In some examples, the wireless communications system 100 may be an Long Term Evolution (LTE) network, LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmit and receive point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the base stations 105 may include a wireless communications manager 101, which may support the base station 105 scheduling a data transmission for a UE according to a first receiver bandwidth, receiving an indication that a data packet of the data transmission was unsuccessfully decoded by the UE; and scheduling a retransmission of the data packet to the UE, based on the indication that the data packet was unsuccessfully decoded, according to a second receiver bandwidth that is wider than the first receiver bandwidth or narrower than the first receiver bandwidth.

Figure 2A:
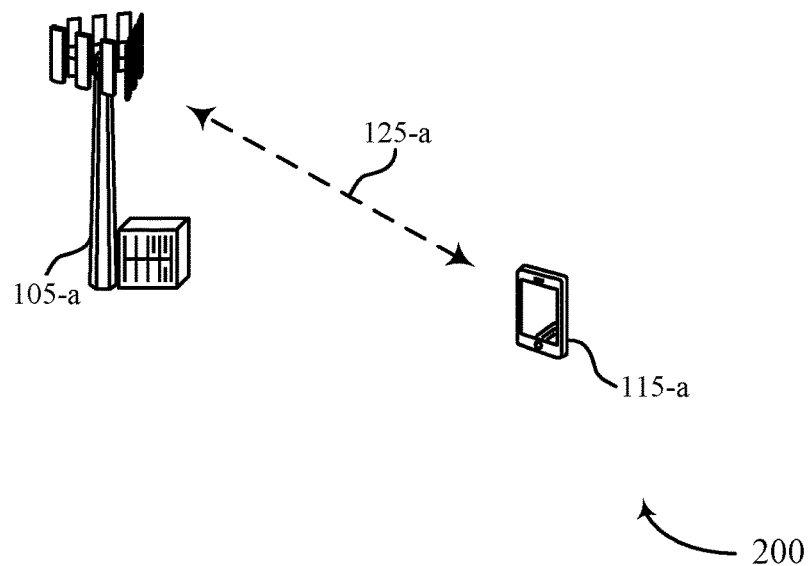
FIG. 2A illustrates an example of a wireless communications system that supports dynamic monitoring and scheduling in retransmission in accordance with aspects of the present disclosure.

One or more of the UEs 115 may include a wireless communications manager 102, which may support the UE 115 receiving a data transmission using a first receiver bandwidth, determining that a data packet of the data transmission was unsuccessfully decoded, switching to a second receiver bandwidth that is wider than the first receiver bandwidth or narrower than the first receiver bandwidth, the switching based on determining that the data packet was unsuccessfully decoded, and receiving a retransmission of the data packet using the second receiver bandwidth FIG. 2A illustrates an example of a wireless communications system 200 that supports dynamic monitoring and scheduling in retransmission in accordance with aspects of the present disclosure. In some examples, the wireless communications system 200 may implement aspects of a wireless communications system 100 described with reference to FIG. 1. The wireless communications system 200 may include a base station 105-a and a UE 115-a, which may be examples of a base station 105 and a UE 115 described with reference to FIG. 1.

The base station 105-a and the UE 115-a may support bidirectional communications via a communication link 125-a, which may be an example of communication links 125 described with reference to FIG. 1. The communication link 125-a may support communications according to an acknowledged-mode communication protocol, where a receiving device indicates a successful reception of data (e.g., a successful decoding of a data packet), or indicates an unsuccessful reception of data (e.g., an unsuccessful decoding of a data packet). In some examples, a confirmation of successful reception by the receiving device may be sent by transmitting an ACK to the transmitting device. In the event that data (e.g., an indicated data packet) is not successfully received and decoded, the receiving device may transmit a NACK to the transmitting device (e.g., a NACK associated with the indicated data packet). The transmitting device may subsequently retransmit the data packet to provide the receiving device another opportunity to attempt to receive and decode the data packet.

In accordance with aspects of the present disclosure, a receiving device may support monitoring a frequency spectrum and receiving over the frequency spectrum according to different receiver bandwidths for an initial transmission (e.g., an initial transmission of a data packet) and a subsequent retransmission (e.g., one or more subsequent retransmissions of the data packet). Likewise, a transmitting device may support scheduling and transmitting data transmissions using a frequency spectrum according to different receiver bandwidths for an initial transmission (e.g., an initial transmission of a data packet) and a subsequent retransmission (e.g., one or more subsequent retransmissions of the data packet).

In other words, a receiving device may monitor a frequency spectrum according to a first receiver bandwidth for data transmissions from a transmitting device. The monitoring may correspond to a first bandwidth part spanning a first portion of a frequency spectrum in the frequency domain. A transmitting device may schedule a data transmission (e.g., including one or more data packets) to be transmitted using the first bandwidth part, or some portion thereof, and transmit the data transmission to the receiving device using the first bandwidth part, or some portion thereof. The receiving device may receive the data transmission using the first receiver bandwidth.

When the receiving device receives, in a data transmission, an indication of a data packet for the receiving device (e.g., control signaling that the receiving device receives while monitoring according to the first receiver bandwidth), the receiving device may subsequently attempt to receive and decode the indicated data packet. If the receiving device successfully receives and decodes the indicated data packet, the receiving device may transmit an ACK to the transmitting device and may continue to monitor the frequency spectrum according to the first receiver bandwidth (e.g., over the first bandwidth part). The transmitting device may continue to schedule data transmissions to be transmitted using the first bandwidth part (e.g., based on receiving the ACK).

If the receiving device does not successfully receive and decode an indicated data packet, the receiving device may transmit a NACK, and switch to monitoring the frequency spectrum according to a second receiver bandwidth, which may be wider than the first receiver bandwidth or narrower than the first receiver bandwidth. The transmitting device may schedule retransmissions (e.g., retransmission of one or more data packets) according to the second receiver bandwidth (e.g., of the receiving device). In other words, the transmitting device may schedule retransmissions of the data packet(s) over a second bandwidth part of the frequency spectrum that is wider than the first bandwidth part or narrower than the first bandwidth part.

In one example, the transmitting device may select from resources of a second bandwidth part that is wider than the first bandwidth part, which may provide improved flexibility (e.g., in the frequency domain) for rescheduling a retransmission of a data packet. In various examples, the first bandwidth part and the second bandwidth part may be overlapping in the frequency domain or non-overlapping in the frequency domain.

In some examples, the second bandwidth part may be formed by a set of bandwidth parts, each of which may or may not have a same width in the frequency domain as the first bandwidth part. The transmitting device may accordingly select one or more of the set of bandwidth parts for retransmitting the data packet, which may include a single retransmission of the data packet, or multiple (e.g., redundant) retransmissions of the data packet. In such an example, the receiving device may monitor the set of bandwidth parts for the retransmission, and may receive a retransmission of the data packet on one or more of the set of bandwidth parts.

If the receiving device successfully receives and decodes a retransmitted data packet, the receiving device may transmit an ACK for the retransmitted data packet, and switch back to monitoring the frequency spectrum according to the first receiver bandwidth. In one example, the first receiver bandwidth may be narrower than the second receiver bandwidth, and returning to the first receiver bandwidth may reduce power consumption at the receiving device (e.g., as compared with a power consumption when using the second receiver bandwidth). The transmitting device may schedule subsequent data transmissions according to the first receiver bandwidth (e.g., based on receiving the ACK for the retransmitted data packet), which may include returning to transmitting using the first bandwidth part for subsequent data transmissions, indicating a new bandwidth part for subsequent data transmissions, or using a bandwidth part associated with the successful retransmission of a data packet (e.g., with or without explicit signaling that indicates the bandwidth part for subsequent transmissions).

A receiving device may perform the described switching between receiver bandwidths according to various techniques. In one example, the receiving device may include multiple receiving components having different respective bandwidths, and switching to a different receiver bandwidth may include switching from one receiving component to another receiving component having a wider or narrower bandwidth. For example, a receiving device may include a narrowband receiver module having narrowband radio frequency (RF) and baseband components, and a wideband receiver module having wideband RF and baseband components. In such an example, switching to a different receiver bandwidth may include switching from the narrowband receiver module to the wideband receiver module, or from the wideband receiver module to the narrowband receiver module.

In another example, a receiving device may include a set receiving components that may each have the same or different bandwidths, and switching to a different receiver bandwidth may include switching from a first quantity of the set of receiving components to a second, different quantity of the set of receiving components, thereby switching to a different aggregate receiver bandwidth. In an example where a receiving device includes a narrowband receiver module and a wideband receiver module, switching from a relatively narrow receiver bandwidth to a relatively wide receiver bandwidth may include switching from using the narrowband receiver module to using both the narrowband receiver module and the wideband receiver module.

In another example, a receiving device may include a receiver having multiple receiver chains associated with different respective bandwidths, and switching to a different receiver bandwidth may include switching from one receiver chain to another receiver chain having a wider or narrower bandwidth. For example, a receiver may include different receiver chains that include one or more demodulators, analog-to-digital converters, or other components, and switching to a different receiver bandwidth may include switching from one receiver chain to another receiver chain that includes components associated with a wider or narrower bandwidth.

In another example, a receiving device may include a receiver or a processing component that is configurable with one of a set of processing bandwidths, and switching to a different receiver bandwidth may include switching from one processing bandwidth to another processing bandwidth having a wider or narrower bandwidth. In one example, a processing component may be configurable to monitor (e.g., receive and decode) control channels that span a particular frequency range, and switching to a different receiver bandwidth may include switching from one control channel monitoring bandwidth to another control channel monitoring bandwidth that spans a wider or narrower bandwidth.

In various examples, a receiving device in accordance with the present disclosure may be configured to employ any of these techniques, other techniques, or combinations of such techniques, to switch to a different receiver bandwidth to support dynamic monitoring and reception in retransmission as described herein.

As used herein, the term "data packet" may refer to a unit of data for transmission between a transmitting device and a receiving device. For example, a data packet may refer to a packet of data according to a particular communications protocol, such as an IP packet or a transmission control protocol (TCP) packet. In some examples, a data packet may refer to a data unit of a communications protocol stack (e.g., a unit of data transferred between one protocol layer and another protocol layer), such as a protocol data unit (PDU) or a service data unit (SDU) of a particular protocol layer. A data packet may be transmitted over a communications medium, including, for example one or more modulated signals such as OFDM symbols carried by one or more carrier frequencies or subcarrier frequencies of a radio frequency spectrum band.

As used herein, "decoding" may refer to one or more operations performed by a receiving device to successfully receive a data packet, which may include various operations of signal reception, analog or digital signal processing such as filtering, analog-to-digital conversion, Fourier transformation or fast Fourier transformation (FFT), demodulation, and others. "Decoding" may also refer to various operations of protocol-level processing that may be performed to reassemble a data packet from a received signal.

Figure 2B:
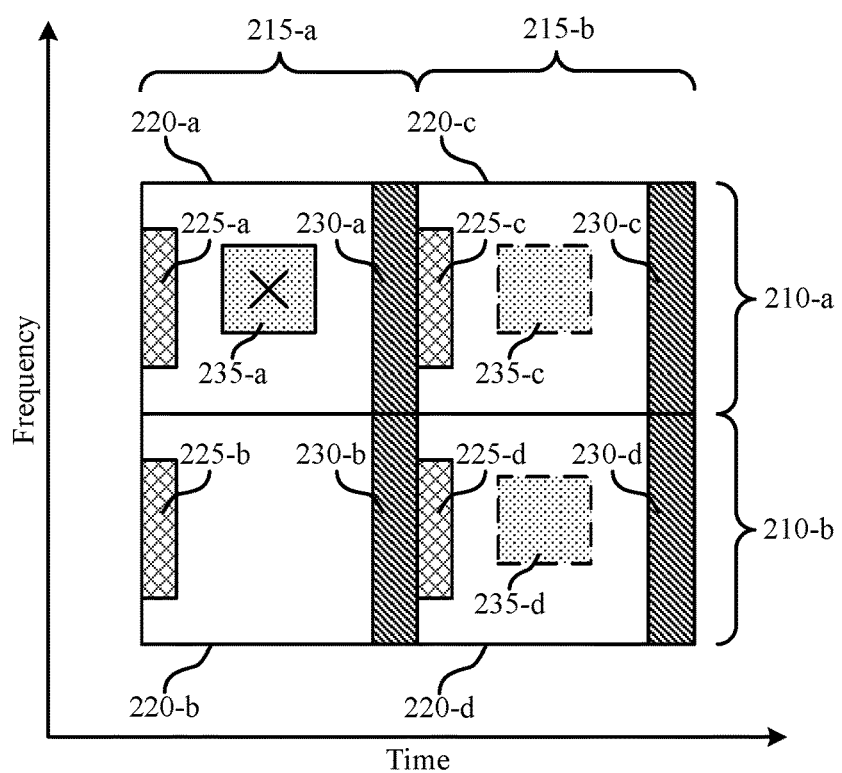
FIG. 2B illustrates an example of communications that support dynamic monitoring and scheduling in retransmission in accordance with aspects of the present disclosure

FIG. 2B illustrates an example of communications 205 that support dynamic monitoring and scheduling in retransmission in accordance with aspects of the present disclosure. In some examples, the communications 205 may implement aspects of a wireless communications system 100 or 200 described with reference to FIGS. 1 and 2A. For example, the communications 205 may be performed by the wireless communications system 200, where the base station 105-*a* may be an example of a transmitting device (e.g., scheduling and transmitting data packets) and the UE 115-*a* may be an example of a receiving device (e.g., monitoring for and receiving data packets). In other examples, the communications 205 may illustrate communications where a UE 115 is an example of a transmitting device and a base station 105 is an example of a receiving device. In other examples, the communications 205 may illustrate communications where a first UE 115 is an example of a transmitting device and a second UE 115 is an example of a receiving device (e.g., supporting monitoring and scheduling in retransmission according to a peer-to-peer or device-to-device communication protocol).

The communications 205 may illustrate communications over resources in the frequency domain and the time domain, which may be divided into resource sets 220. For example, a first resource set 220-*a* may include resources in a first time interval 215-*a* over a first bandwidth part 210-*a*, a second resource set 220-*b* may include resources in the first time interval 215-*a* over a second bandwidth part 210-*b*, a third resource set 220-*c* may include resources in a second time interval 215-*b* over the first bandwidth part 210-*a*, and a fourth resource set 220-*d* may include resources in the second time interval 215-*a* over the second bandwidth part 210-*b*.

Each of the bandwidth parts 210 may be associated with a particular frequency range of a frequency spectrum (e.g., a radio frequency spectrum band). For example, a bandwidth part 210 may correspond to a set of resource blocks that are contiguous in the frequency domain. In other words, a bandwidth part 210 may correspond to a particular set of frequency subcarriers that are contiguous on the frequency domain. In some examples, a bandwidth part may be selected from a contiguous subset of the common resource blocks for a given numerology on a given frequency carrier. The bandwidth part 210-*a* and the bandwidth part 210-*b* may collectively be referred to as a set of bandwidth parts.

In some examples certain data packets, such as downlink packets associated with IoT communications, may have relatively small payload size. In such examples, a transmitting device such as the base station 105-*a* may assign downlink data channels with a relatively small physical resource block (PRB) footprint in the frequency domain (e.g., a 1 MHz bandwidth) for an initial transmission of a data packet. Accordingly, in some examples, a bandwidth part as described herein may have a frequency span of 1 MHz, or some portion of a 1 MHz bandwidth. In some examples, such an assignment may be associated with a semi-persistent scheduling (SPS) between the base station 105-*a* and the UE 115-*b*

Although the first bandwidth part 210-*a* and the second bandwidth part 210-*b* are illustrated with the same span in the frequency domain, in various examples bandwidth parts 210 may have a same span in the frequency domain or different spans in the frequency domain. Further, although the first bandwidth part 210-*a* and the second bandwidth part 210-*b* are shown as non-overlapping in the frequency domain, in various examples a bandwidth part 210 may be defined as having a span that is overlapping or non-overlapping in the frequency domain with another bandwidth part 210. More generally, a bandwidth part 210 may refer to a particular span of communications resources in the frequency domain, which may be defined as a frequency range, a number of frequency carriers, a number of frequency subcarriers, a number of frequency channels, or some other allocation of resources in the frequency domain.

Each of the resource sets 220 may include a respective downlink control portion 225, which in some examples may include one or more downlink control channels (e.g., one of more PDCCH). The downlink control portion 225 may include, among other things, an indication of data (e.g., one or more data packets included in the respective resource set 220) that are scheduled for one or more receiving devices. Accordingly, in the example of communications 205, the base station 105-*a* may use a downlink control portion to indicate to the UE 115-*a* that a resource set 220 contains data to be received and decoded by the UE 115-*a*.

Each of the resource sets 220 may also include a respective downlink data portion 235, which in some examples may include, among other things, one or more downlink data channels (e.g., one or more PDSCH) for data transmission to one or more receiving devices. In some examples a downlink data portion 235 may be associated with a semi-persistent scheduling, and may be referred to as an SPS data channel (e.g., an SPS PDSCH). A downlink data portion 235 may include signaling associated with a downlink data packet (e.g., information of the downlink data packet that has been coded and modulated for wireless transmission using modulation symbols carried via resources of the respective resource set 220). In other words, the downlink data portion 235 may be considered to include a data packet being transmitted via wireless resources of the resource set, and a receiving device may attempt to decode the downlink data portion 235 in order to successfully receive the data packet. In the example of communications 205, each of the downlink data portions 235 may illustrate portions of a resource set 220 that may be allocated for one or more data packets for the UE 115-*a*.

Each of the resource sets 220 may also include an uplink control portion 230, which in some examples may include one or more uplink channels (e.g., one or more PUCCH). An uplink control portion 230 may provide resources for, among other things, uplink responses to downlink data, such as an ACK/NACK that may be transmitted by a receiving device in response to attempting to decode an indicated data transmission.

Thus, in the example of communications 205, each of the time intervals 215-*a* may illustrate a round-trip time in which a data transmission may be transmitted by a transmitting device and a response may be transmitted by a receiving device. Accordingly, each of the time intervals 215 may include one or more TTI durations. In other words, each of the resource sets 220 may span one or more subframes in duration, one or more slots in duration, one or more symbols in duration, or some other number of transmission intervals according to a particular communications protocol.

In the example of communications 205, an initial data transmission may be transmitted during the first time interval 215-*a* according to a first receiver bandwidth. For example, the base station 105-*a* may schedule transmission of a data packet for the UE 115-*a* on the first bandwidth part 210-*a* during the first time interval 215-*a*. In various examples, the first receiver bandwidth, or the first bandwidth part 210-*a*, or both, may be agreed upon between the base station 105-*a* and the 115-*a* as part of a connection establishment handshake (e.g., as part of establishing the communication link 125-*a*), or as part of other signaling between the base station 105-*a* and the UE 115-*a* (e.g., before or after establishing the communication link 125-*a*). In various examples, the first receiver bandwidth, or the first bandwidth part, or both, may be associated with, or based on a configuration of the base station 105-*a* or the UE 115-*a*.

The UE 115-*a* may monitor the first bandwidth part 210-*a* for an initial data transmission, based on the configuration of the UE 115-*a*, a connection establishment handshake with the base station 105-*a*, other signaling with the base station 105-*a*, or a combination thereof. In one example, the UE 115-*a* may use a narrowband receiver module, including narrowband RF and baseband components, to monitor for and receive the initial data transmission. In some examples, monitoring according to the first receiver bandwidth may include the UE 115-*a* receiving and decoding control signaling (e.g., in a PDCCH) to identify data transmissions scheduled for the UE 115-*a*. Thus, to monitor according to the first receiver bandwidth for an initial data transmission, the UE 115-*a* may receive and decode the downlink control portion 225-*a* of the first resource set 220-*a*. When monitoring according to the first receiver bandwidth, the UE 115-*a* may not attempt to receive communications via the second bandwidth part 210-*b*. In other words, the UE 115-*a* may not receive or decode the downlink control portion 225-*b* of the resource set 220-*b*.

Based on the monitoring for an initial data transmission (e.g., decoding the downlink control portion 225-*a*), the UE 115-*a* may determine that the resource set 220-*a* includes a downlink data portion 235-*a* that is scheduled for the UE 115-*a*. In some examples the downlink data portion 235-*a* may include a downlink data channel, such as an SPS PDSCH. Based on determining the presence of a data portion for the UE 115-*a*, the UE 115-*a* may attempt to receive and decode the downlink data portion 235-*a* (e.g., decode one or more data packets of the downlink data portion 235-*a*).

If a downlink data portion 235-*a* is received successfully (e.g., decoded successfully), the UE 115-*a* may send an ACK and wait for (e.g., monitor for) a subsequent data transmission over the first bandwidth part 210-*a*. However, in the example of communications 205, the downlink data portion 235-*a* may not be decoded successfully. Thus, the UE 115-*a* may transmit a NACK associated with the downlink data portion 235-*a* (e.g., a NACK associated with a data packet of the downlink data portion 235-*a* that was unsuccessfully decoded), which may include transmitting the NACK using the uplink control resources 230-*a*.

The UE 115-*a* may subsequently switch to using a second receiver bandwidth (e.g., a wider receiver bandwidth, such as a wideband bandwidth), that is, switch to monitoring the second receiver bandwidth, based on determining that the downlink data portion 235-*a* was unsuccessfully decoded. In one example, the UE 115-*a* may use a wideband receiver module, including wideband RF and baseband components (e.g., having a bandwidth of 10 MHz, 20 MHz, 100 MHz, or some other receiver bandwidth that is wider than the first receiver bandwidth), to monitor for and receive a retransmission of at least a portion of the downlink data portion 235-*a* that was unsuccessfully decoded. In some examples, such receiving or monitoring may include monitoring for downlink control information (e.g., a downlink control channel such as a PDCCH) that may arrive in any frequency portion of the wider bandwidth that is being monitored.

The base station 105-*a* may receive the uplink control portion 230-*a*, which may include receiving the NACK that indicates that at least a portion of the downlink data portion 235-*a* was unsuccessfully received by the UE 115-*a*. Based on this indication, and in some examples based on a communications standard or other prior configuration (e.g., an RRC configuration), agreement, or signaling between the base station 105-*a* and the UE 115-*a* to perform dynamic monitoring and scheduling in retransmission, the base station 105-*a* may schedule, according to a second receiver bandwidth, a retransmission of the unsuccessfully decoded portion of the downlink data portion 235-*a*. In some cases, the base station 105-*a* may transmit a configuration message (e.g., an RRC configuration message) to the UE 115-*a* designating the second receiver bandwidth as a bandwidth to be used for retransmissions of data. The base station 105-*a* may transmit a configuration message to the UE 115-*a* as part of a connection establishment handshake (e.g., as part of establishing the communication link 125-*a*), or as separate signaling between the base station 105-*a* and the UE 115-*a*. In other words, the base station 105-*a* may understand that that, having sent a NACK in the uplink control portion 230-*a*, the UE 115-*a* will switch to a different receiver bandwidth (e.g., a wider receiver bandwidth), such that the base station 105-*a* may select from a different set of resources (e.g., spanning a different range in the frequency domain) than those used for an initial transmission.

In the example of communications 205, the UE 115-*a* may switch to monitoring both the first bandwidth part 210-*a* and the second bandwidth part 210-*b* during the second time interval 215-*b* (e.g., using a wider receiver bandwidth than when monitoring only the first bandwidth part 210-*a* during the first time interval 215-*a*). The base station 105-*a* may accordingly schedule a retransmission of the unsuccessfully decoded data for the UE 115-*a* using a downlink data portion 235-*c* of the third resource set 220-*c*, a downlink data portion 235-*d* of the fourth resource set 220-*d*, or both.

To monitor the first bandwidth part 210-*a* and the second bandwidth part 210-*b*, the UE 115-*a* may receive (e.g., using the second receiver bandwidth) the downlink control portion 225-*c* and the downlink control portion 225-*d*, and decode the received downlink control portions 225-*c* and 225-*d* to identify whether the downlink data portion 235-*c*, the downlink data portion 235-*d*, or both, include data for the UE 115-*a*. In the example of the communications 205, the downlink data portion 235-*d* of the fourth resource set 220-*d* may include a retransmission of a data packet that was unsuccessfully decoded from the downlink data portion 235-*a* of the first resource set 220-*a* by the UE 115-*a*. Accordingly, the UE 115-*a* may receive the retransmission of the data packet (e.g., using the second receiver bandwidth) and attempt to decode the retransmitted data packet.

In the example of communications 205, the downlink data portion 235-*d* may be decoded successfully by the UE 115-*a*. In other words, the retransmitted data packet included in the downlink data portion 235-*d* may be successfully received and decoded. Thus, the UE 115-*a* may transmit an ACK associated with the downlink data portion 235-*a* (e.g., an ACK associated with the retransmitted data packet), which may include transmitting the ACK using the uplink control resources 230-*d*. The UE 115-*a* may subsequently switch to using the first receiver bandwidth (e.g., a narrower receiver bandwidth, based on determining that the downlink data portion 235-*d* was successfully decoded).

In various examples, the return to monitoring according to the first receiver bandwidth may be associated with monitoring different bandwidth parts 210. In one example, the UE 115-*a* may return to monitoring the first bandwidth part 210-*a* without further signaling from the base station 105-*a* (e.g., where the bandwidth part 210-*a* is a default bandwidth part, or is associated with an SPS configuration). In another example, the UE 115-*a* may proceed with monitoring the second bandwidth part 210-*b* without further signaling from the base station 105-*a*. For example, the base station 105-*a* and the UE 115-*a* may have a configuration or other agreement that the UE 115-*a* will monitor a bandwidth part 210 associated with successful transmission and reception. Thus, based on the UE 115-*a* successfully decoding the downlink data portion 235-*d* of the fourth resource set 220-*d*, using the second bandwidth part 210-*b*, the UE 115-*a* may therefore proceed with monitoring the second bandwidth part 210-*b* in subsequent time intervals 215. Based on the UE 115-*a* transmitting the ACK associated with the successful decoding of the downlink data portion 235-*d*, and the base station 105-*a* receiving the ACK (e.g., receiving an indication in the ACK that identifies the second bandwidth part 210-*b*, or receiving the ACK using resources of the second bandwidth part 210-*b*), the base station 105-*b* can proceed with scheduling subsequent data transmissions using the second bandwidth part 210-*b*. In other examples, the base station 105-*a* may indicate a bandwidth part 210 for subsequent data transmissions, which may include the first bandwidth part 210-*a*, or the second bandwidth part 210-*b*, some other bandwidth part 210 (not shown), or any combination thereof.

In various examples, supporting a selection from different ranges of resources in the frequency domain for initial transmissions and retransmissions may improve flexibility for scheduling and transmitting the different types of transmissions by a transmitting device. In one example, when data transmissions are associated with a single transmitting device, such as a single base station 105 (e.g., the base station 105-*a*), or a single TRP, monitoring for wideband downlink control channels may improve scheduling flexibility for the single transmitting device. In another example, a base station 105 and a UE 115 may support communications with multiple TRPs, and certain TRPs may be associated with particular frequency resources (e.g., certain portions of a radio frequency spectrum). In such cases, monitoring for wideband downlink control channels may support scheduling flexibility for a central controller, where the central controller may select, for a retransmission, from one or more TRPs associated with certain frequency bands. Further, in various examples, supporting a monitoring and reception according to different ranges of resources in the frequency domain (e.g., different receiver bandwidths) for initial transmissions and retransmissions may support enhanced power-saving techniques at a receiving device. Thus, in accordance with the described techniques, dynamic monitoring and scheduling in retransmission may be employed to balance considerations related to retransmission scheduling flexibility at a transmitting device and power consumption at a receiving device.

Figure 3:
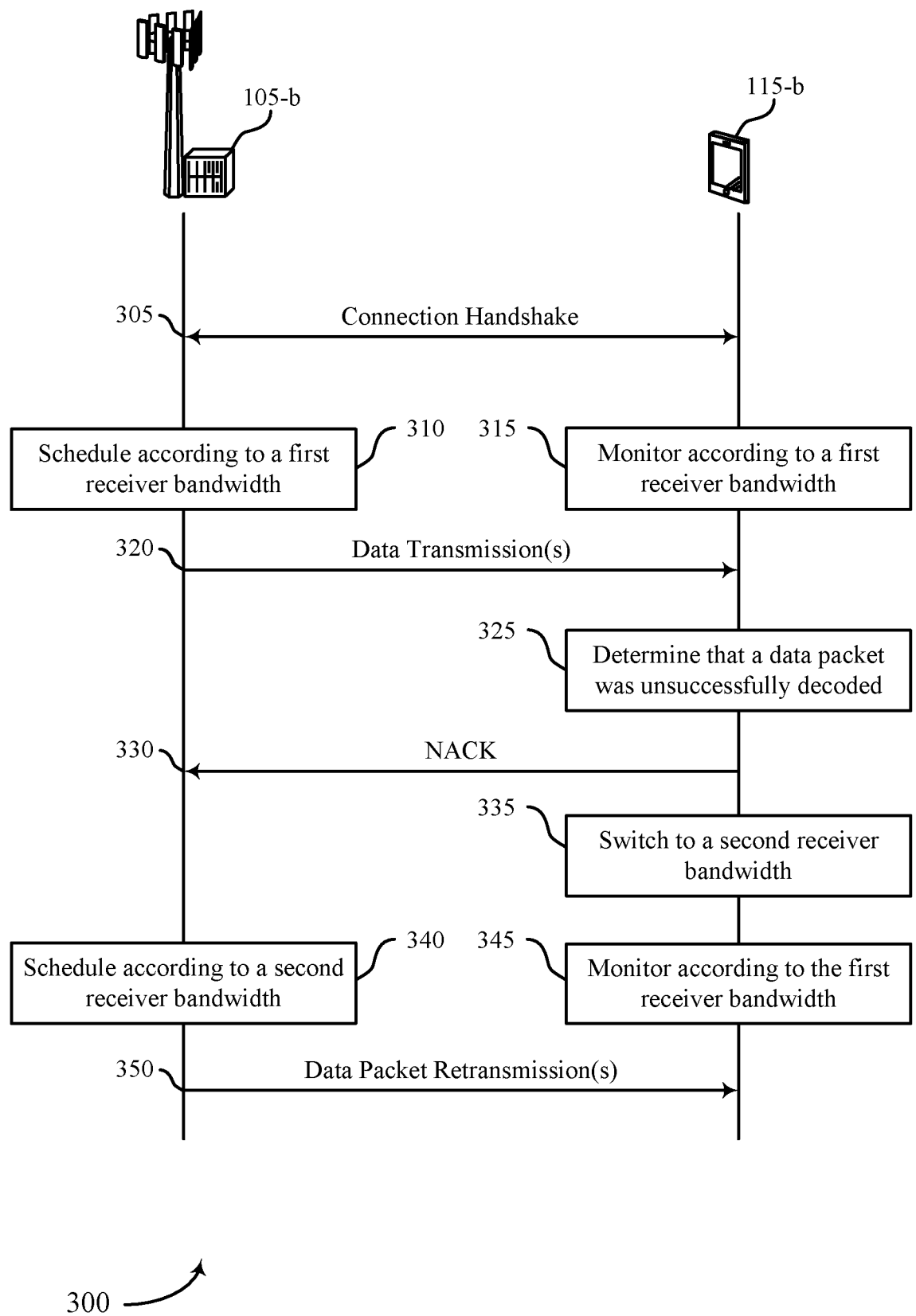
FIG. 3 illustrates an example of a communications sequence that supports dynamic monitoring and scheduling in retransmission in accordance with aspects of the present disclosure.

FIG. 3 illustrates an example of a communications sequence 300 that supports dynamic monitoring and scheduling in retransmission in accordance with aspects of the present disclosure. In some examples, communications sequence 300 may implement aspects of a wireless communications system 100 or 200. For example, the communications sequence 300 illustrates an example where a base station 105-*b* is a transmitting device (e.g., transmitting data packets) and a UE 115-*b* is a receiving device (e.g., receiving data packets). Thus, the communications sequence 300 may illustrate an example of dynamic monitoring and scheduling for downlink transmission and retransmission.

At 305, and base station 105-*b* and the UE 115-*b* may perform a connection handshake. In some examples, the connection handshake may include an indication of a bandwidth part for scheduling and monitoring according to a first receiver bandwidth. In other examples, the base station 105-*b* may transmit an indication of a bandwidth part for scheduling and monitoring separately from a connection handshake, which may correspond to a dynamic scheduling of a bandwidth part after establishing a connection. In some cases, the base station 105-*b* may transmit a configuration message (e.g., an RRC configuration message) to the UE 115-*b* during the connection establishment handshake. In other cases, the base station 105-*b* may transmit the configuration message to the UE 115-*b* as a separate signaling message. The configuration message may designate a second receiver bandwidth as a bandwidth to be used for retransmissions of data.

At 310, the base station 105-*b* may schedule communications (e.g., data transmissions) for the UE 115-*b* according to a first receiver bandwidth.

At 315, the UE 115-*b* may monitor a frequency spectrum according to a first receiver bandwidth. For example, the UE 115-*b* may receive transmissions over the first bandwidth part. In some examples, monitoring according to the first receiver bandwidth may include receiving downlink control information (e.g., one or more PDCCH) over the first bandwidth part, and decoding the received downlink control information to determine whether a data transmission has been scheduled for the UE 115-*b*.

At 320, the base station 105-*b* may transmit one or more data transmissions for the UE 115-*b*. For example, the data transmission(s) at 320 may include downlink control information (e.g., one or more PDCCH) indicating the presence of data packets scheduled for the UE 115-*b*, as scheduled at 415 according to the first receiver bandwidth. Accordingly, the UE 115-*b* may receive the data transmission(s) at 320 (e.g., as a result of monitoring according to the first receiver bandwidth). The UE 115-*b* may subsequently attempt to decode one or more data packets (e.g., according to control information received from the base station 105-*b* that indicates the presence of the one or more data packets for the UE 115-*b*)

At 325, the UE 115-*b* may determine that a data packet of the data transmissions of 425 was unsuccessfully decoded.

At 330, the UE 115-*b* may transmit a NACK associated with the data packet (e.g., based on determining that the data packet was unsuccessfully decoded). Accordingly, the base station 105-*b* may receive the NACK, indicating to the base station 105-*b* that the UE 115-*b* unsuccessfully decoded the data packet.

At 335, the UE 115-*b* may switch to a second receiver bandwidth (e.g., based on determining at 325 that the data packet was unsuccessfully decoded). In various examples, the second receiver bandwidth may be wider than the first receiver bandwidth, or may be narrower than the first receiver bandwidth (e.g., in the frequency domain). In some cases, the UE 115-*b* may switch to the second receiver bandwidth based on the configuration message, as may have been received during the connection establishment handshake at 305, or in other signaling from the base station 105-*b* (e.g., in a separate RRC configuration message).

At 340, the base station 105-*b* may switch to scheduling according to a second receiver bandwidth, where the second receiver bandwidth is wider than the first receiver bandwidth or narrower than the first receiver bandwidth (e.g., in the frequency domain). The scheduling according to the second receiver bandwidth may include scheduling a retransmission of a data packet for the UE 115-*b* (e.g., the data packet that was indicated at 330 to have been unsuccessfully decoded). In some examples, the scheduling at 340 may include data packets other than (e.g., in addition to) the data packet that was indicated to have been unsuccessfully decoded. The scheduling according to the second receiver bandwidth at 340 may include scheduling over a second bandwidth part, which may be wider than or narrower than the first bandwidth part, and the second bandwidth part may be overlapping in the frequency domain with the first bandwidth part or non-overlapping in the frequency domain with the first bandwidth part. In various examples, scheduling using the second bandwidth part may include indicating (e.g., in a transmission to the UE 115-*b*) second bandwidth part, or based on some other configuration or standard at the base station 105-*b* in which the base station 105-*b* understands which bandwidth part the UE 115-*b* will monitor according to the second receiver bandwidth (e.g., based on receiving the NACK at 335).

At 345, the UE 115-*b* may monitor a frequency spectrum according to a second receiver bandwidth. For example, the UE 115-*b* may monitor the second bandwidth part described with reference to the operations of 340. In various examples monitoring a second bandwidth part may be based on an indication of the second bandwidth part received from the base station 105-*b*, or based on some other configuration or standard at the UE 115-*b* in which the UE 115-*b* understands which bandwidth part to monitor according to the second receiver bandwidth (e.g., based on the switch to a second receiver bandwidth at 340).

At 350, the base station 105-*b* may transmit another data transmission, which may include a retransmission of a data packet. For example, the data transmission at 350 may include the retransmission of a data packet as scheduled at 340 according to the second receiver bandwidth. Accordingly, the UE 115-*b* may receive the data transmission(s) at 350 (e.g., as a result of monitoring according to the second receiver bandwidth). The UE 115-*b* may attempt to decode one or more retransmitted data packets (e.g., according to control information received from the base station 105-*b* that indicates the presence of the one or more data packets for the UE 115-*b*).

Figure 4:
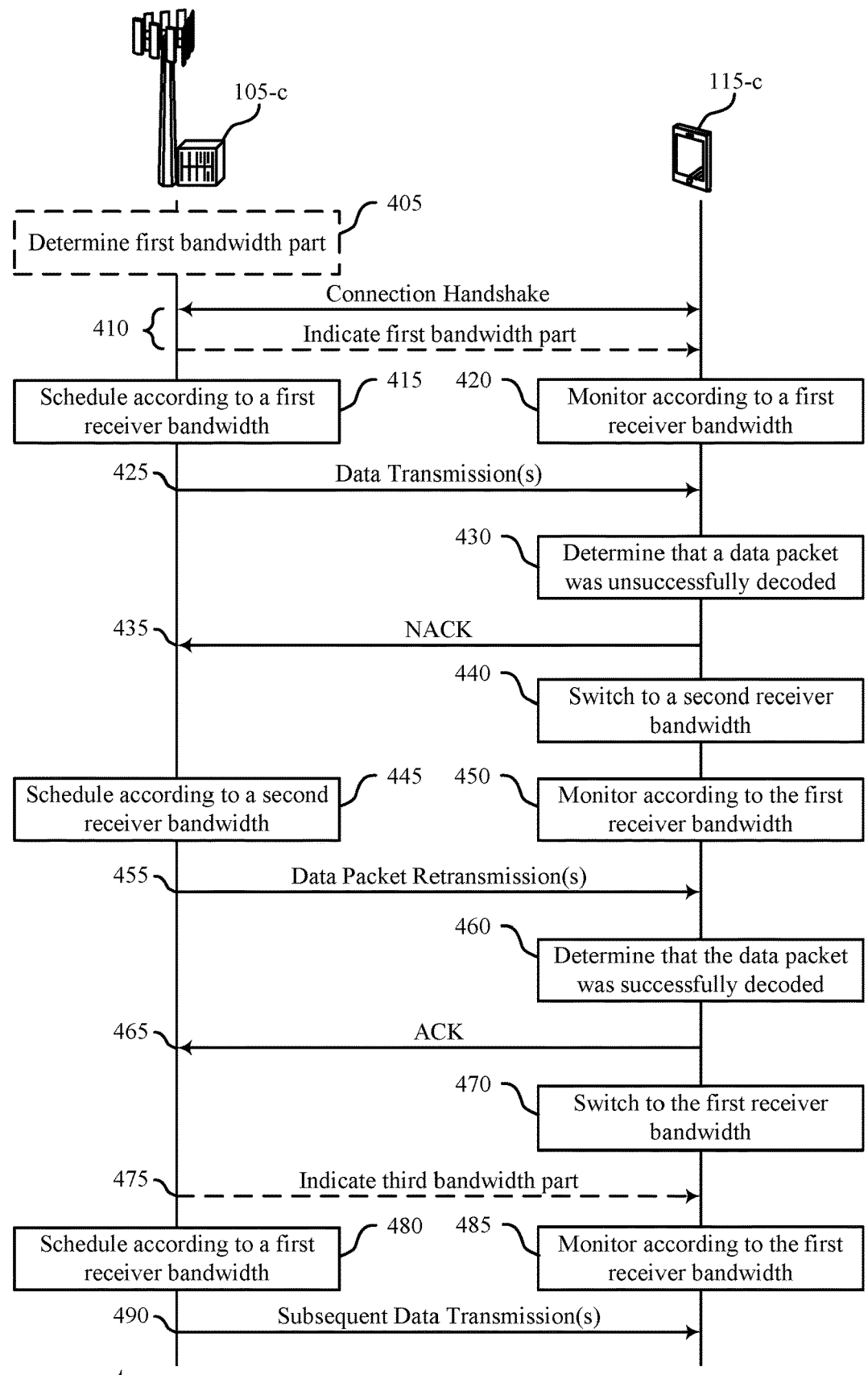
FIG. 4 illustrates an example of a communications sequence that supports dynamic monitoring and scheduling in retransmission in accordance with aspects of the present disclosure.

FIG. 4 illustrates an example of a communications sequence 400 that supports dynamic monitoring and scheduling in retransmission in accordance with aspects of the present disclosure. In some examples, communications sequence 400 may implement aspects of a wireless communications system 100 or 200. For example, the communications sequence 400 illustrates an example where a base station 105-*c* is a transmitting device (e.g., transmitting data packets) and a UE 115-*c* is a receiving device (e.g., receiving data packets). Thus, the communications sequence 400 may illustrate an example of dynamic monitoring and scheduling for downlink transmission and retransmission.

At 405, the base station 105-*c* may determine a first bandwidth part. The first bandwidth part may be a range of communication resources in the frequency domain that the base station 105-*c* may use to schedule and transmit a data transmission to the UE 115-*c*. The first bandwidth may correspond to a first receiver bandwidth (e.g., a first range of frequency that the UE 115-*c* may monitor for data transmissions and receive data transmissions).

At 410, and base station 105-*c* and the UE 115-*c* may perform a connection handshake. In some examples, the connection handshake may include an indication of the first bandwidth part (e.g., as determined by the base station 105-*c* at 405). In other examples, the base station 105-*c* may transmit an indication of a first bandwidth part separately from a connection handshake, which may correspond to a dynamic scheduling of a bandwidth part after establishing a connection. In some cases, the base station 105-*c* may transmit a configuration message (e.g., an RRC configuration message) to the UE 115-*c* during the connection establishment handshake. In other cases, the base station 105-*c* may transmit the configuration message to the UE 115-*c* as a separate signaling message. The configuration message may designate a second receiver bandwidth as a bandwidth to be used for retransmissions of data.

At 415, the base station 105-*c* may schedule communications (e.g., data transmissions) for the UE 115-*c* according to a first receiver bandwidth. For example, the base station 105-*c* may schedule communications using the first bandwidth part that was determined at 405.

At 420, the UE 115-*c* may monitor a frequency spectrum according to a first receiver bandwidth. For example, the UE 115-*c* may receive transmissions over the first bandwidth part (e.g., as indicated to the UE 115-*c*). In some examples, monitoring according to the first receiver bandwidth may include receiving downlink control information (e.g., one or more PDCCH) over the first bandwidth part, and decoding the received downlink control information to determine whether a data transmission has been scheduled for the UE 115-*c*.

At 425, the base station 105-*c* may transmit one or more data transmissions. For example, the data transmission(s) at 425 may include downlink control information (e.g., one or more PDCCH) indicating the presence of data packets scheduled for the UE 115-*c*, as scheduled at 415 according to the first receiver bandwidth. Accordingly, the UE 115-*c* may receive the data transmission(s) at 425 (e.g., as a result of monitoring according to the first receiver bandwidth). The UE 115-*c* may subsequently attempt to decode one or more data packets (e.g., according to control information received from the base station 105-*c* that indicates the presence of the one or more data packets for the UE 115-*c*)

At 430, the UE 115-*c* may determine that a data packet of the data transmissions of 425 was unsuccessfully decoded.

At 435, the UE 115-*c* may transmit a NACK associated with the data packet (e.g., based on determining that the data packet was unsuccessfully decoded). Accordingly, the base station 105-*c* may receive the NACK, indicating to the base station 105-*c* that the UE 115-*c* unsuccessfully decoded the data packet.

At 440, the UE 115-*c* may switch to a second receiver bandwidth (e.g., based on determining at 430 that the data packet was unsuccessfully decoded). In various examples, the second receiver bandwidth may be wider than the first receiver bandwidth, or may be narrower than the first receiver bandwidth (e.g., in the frequency domain). In some cases, the UE 115-*c* may switch to the second receiver bandwidth based on the configuration message, as may have been received during the connection establishment handshake at 410, or in other signaling from the base station 105-*c* (e.g., in a separate RRC configuration message).

At 445, the base station 105-*c* may switch to scheduling according to a second receiver bandwidth, where the second receiver bandwidth is wider than the first receiver bandwidth or narrower than the first receiver bandwidth (e.g., in the frequency domain). The scheduling according to the second receiver bandwidth may include scheduling a retransmission of a data packet for the UE 115-*c* (e.g., the data packet that was indicated at 435 to have been unsuccessfully decoded). In some examples, the scheduling at 445 may include data packets other than (e.g., in addition to) the data packet that was indicated to have been unsuccessfully decoded. The scheduling according to the second receiver bandwidth at 445 may include scheduling over a second bandwidth part, which may be wider than or narrower than the first bandwidth part determined at 405, and the second bandwidth part may be overlapping in the frequency domain with the first bandwidth part or non-overlapping in the frequency domain with the first bandwidth part. In various examples, scheduling using the second bandwidth part may include indicating (e.g., in a transmission to the UE 115-*c*) second bandwidth part, or based on some other configuration or standard at the base station 105-*c* in which the base station 105-*c* understands which bandwidth part the UE 115-*c* will monitor according to the second receiver bandwidth (e.g., based on receiving the NACK at 435).

At 450, the UE 115-*c* may monitor a frequency spectrum according to a second receiver bandwidth. For example, the UE 115-*c* may monitor the second bandwidth part described with reference to the operations of 445. In various examples monitoring a second bandwidth part may be based on an indication of the second bandwidth part received from the base station 105-*c*, or based on some other configuration or standard at the UE 115-*c* in which the UE 115-*c* understands which bandwidth part to monitor according to the second receiver bandwidth (e.g., based on the switch to a second receiver bandwidth at 440).

At 455, the base station 105-*c* may transmit another data transmission, which may include a retransmission of a data packet. For example, the data transmission at 455 may include the retransmission of a data packet as scheduled at 445 according to the second receiver bandwidth. Accordingly, the UE 115-*c* may receive the data transmission(s) at 455 (e.g., as a result of monitoring according to the second receiver bandwidth). The UE 115-*c* may attempt to decode one or more retransmitted data packets (e.g., according to control information received from the base station 105-*c* that indicates the presence of the one or more data packets for the UE 115-*c*).

At 460, the UE 115-*c* may determine that the retransmitted data packet of the data transmissions of 455 was successfully decoded.

At 465, the UE 115-*c* may transmit an ACK associated with the retransmitted data packet (e.g., based on determining that the retransmitted data packet was successfully decoded). Accordingly, the base station 105-*c* may receive the ACK, indicating to the base station 105-*c* that the UE 115-*c* has successfully decoded the retransmitted data packet.

At 470, the UE 115-*c* may switch to the first receiver bandwidth (e.g., based on determining that the retransmitted data packet was successfully decoded). Although the illustrated example shows the UE 115-*c* returning to the first receiver bandwidth, in other examples the UE 115-*c* may more generally switch to a third receiver bandwidth that is different from the second receiver bandwidth. In various examples, the third receiver bandwidth may be wider than the second receiver bandwidth, or may be narrower than the second receiver bandwidth (e.g., in the frequency domain).

In some examples, at 475, the base station 105-*c* may transmit an indication of a third bandwidth part associated with subsequent data transmissions. In other words, following an initial unsuccessful decoding of a data packet, and a subsequent successful decoding of a retransmission of the data packet, the base station 105-*c* may in some examples determine that the UE 115-*c* should monitor a different bandwidth part than the one used for the initial transmission of the data packet, and indicate the determined bandwidth part.

In another example, the base station 105-*c* and the UE 115-*c* may be configured to schedule and monitor a particular bandwidth part that is identified by a successful decoding of a retransmitted data packet. In other words, the UE 115-*c* may be configured to identify a bandwidth part for subsequent data transmissions based on determining that the retransmitted data packet was successfully decoded (e.g., at 460), and by identifying the bandwidth part that the retransmitted data packet was transmitted on. Thus, the UE 115-*c* may monitor the same bandwidth part as a successful retransmission for subsequent data transmissions. Likewise, the base station 105-*c* may be configured to identify a bandwidth part for subsequent data transmissions based on determining that the retransmitted data packet was successfully decoded (e.g., by receiving the ACK at 465), and by identifying the bandwidth part that the retransmitted data packet was transmitted on (e.g., with the knowledge of the bandwidth part that the retransmitted data packet was transmitted on). Or, in some examples, such as when the data packet was retransmitted using multiple bandwidth parts, the base station 105-*c* may determine a bandwidth part associated with a successful decoding by some indication accompanying the ACK at 465 for the UE 115-*c* to indicate to the base station 105-*c* which bandwidth part was associated with a successful decoding of the retransmitted data packet, or the bandwidth part in which the ACK was transmitted over at 465. In such examples the transmission and reception of a signal indicating a particular bandwidth part at 475 may be omitted.

At 480, the base station 105-*c* may switch back to scheduling according to the first receiver bandwidth.

At 485, the UE 115-*c* may monitor a frequency spectrum according to the first receiver bandwidth.

At 490, the base station 105-*c* may transmit one or more subsequent data transmissions. For example, the subsequent data transmission(s) at 425 may include subsequent data packets as scheduled at 480 according to the first receiver bandwidth. Accordingly, the UE 115-*c* may receive the data transmission(s) at 490 (e.g., as a result of the monitoring of 485 according to the first receiver bandwidth). The UE 115-*c* may subsequently attempt to decode one or more of the subsequent data packets (e.g., according to control information received from the base station 105-*c* that indicates the presence of the one or more subsequent data packets for the UE 115-*c*).

Although described in the context of a base station 105 being an example of a transmitting device and a UE 115 being an example of a receiving device, various other examples are possible in accordance with the present disclosure. In another example, a UE 115 may perform the operations described in the context of a transmitting device, and a base station 105 may perform the operations described in the context of a receiving device (e.g., for dynamic monitoring and scheduling for uplink transmission and retransmission). In another example, a first UE 115 may perform the operations described in the context of a transmitting device, and a second UE (e.g., a different UE) may perform the operations described in the context of a receiving device (e.g., for dynamic monitoring and scheduling for peer-to-peer or device-to-device transmission and retransmission). In various examples, the same device may perform the operations described in the context of a transmitting device (e.g., for a first communications stream, such as uplink communications) as well as the operations described in the context of a receiving device (e.g., for a second communications stream, such as a downlink communications).

Figure 5:
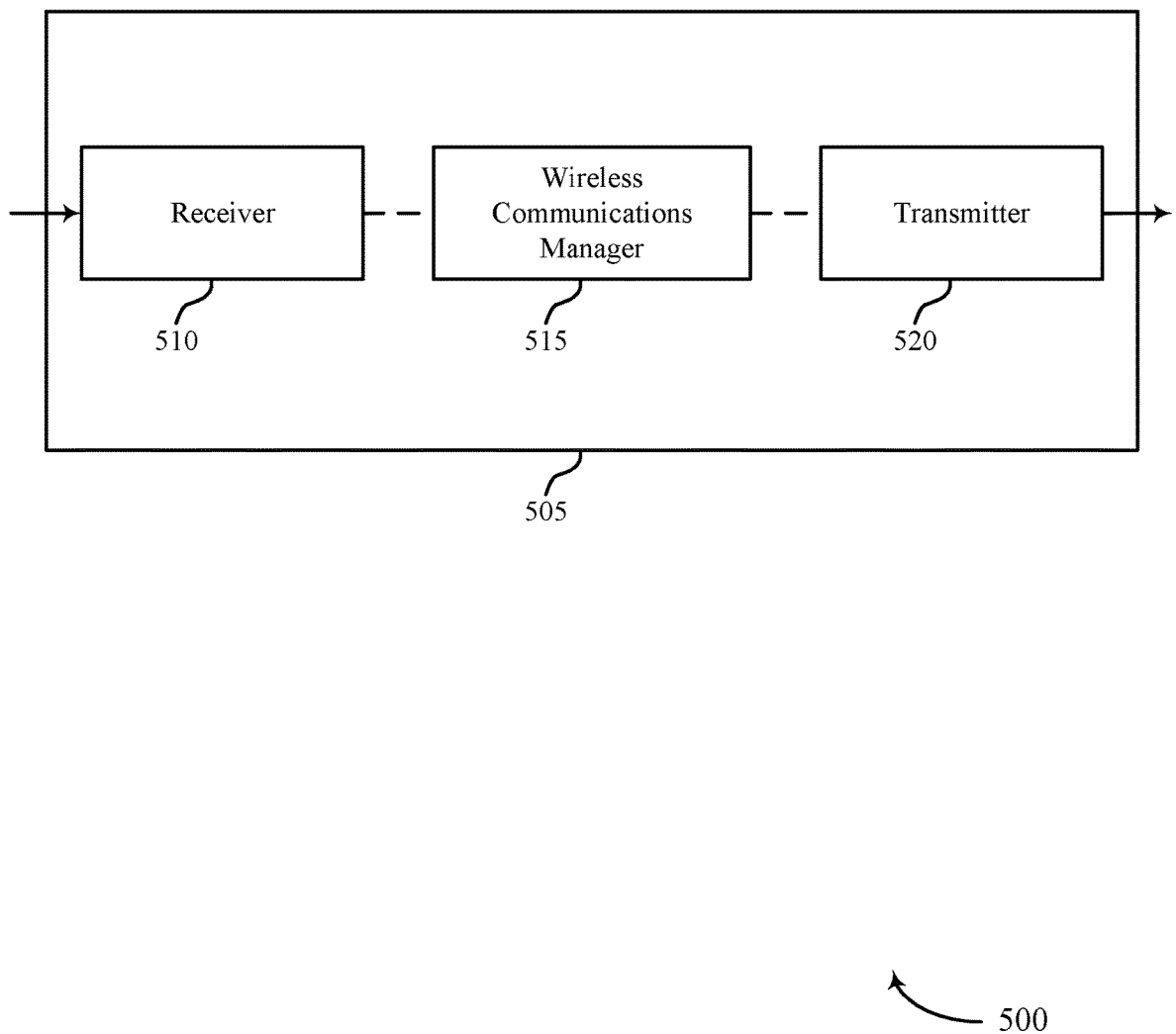
FIGS. 5 and 6 show block diagrams of devices that support dynamic monitoring and scheduling in retransmission in accordance with aspects of the present disclosure.

FIG. 5 shows a block diagram 500 of a device 505 that supports dynamic monitoring and scheduling in retransmission in accordance with aspects of the present disclosure. The device 505 may be an example of aspects of a UE 115 as described herein. The device 505 may include a receiver 510, a wireless communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to dynamic monitoring and scheduling in retransmission, etc.). Information may be passed on to other components of the device 505. The receiver 510 may be an example of aspects of the transceiver 820 described with reference to FIG. 8. The receiver 510 may utilize a single antenna or a set of antennas.

The wireless communications manager 515 may monitor a first receiver bandwidth for downlink transmissions, receive a data transmission in the first receiver bandwidth, determine that a data packet of the data transmission was unsuccessfully decoded, switch to monitor a second receiver bandwidth that is wider than the first receiver bandwidth or narrower than the first receiver bandwidth, the switching based on determining that the data packet was unsuccessfully decoded, and receive a retransmission of the data packet in the second receiver bandwidth. The wireless communications manager 515 may be an example of aspects of the wireless communications manager 810 described with reference to FIG. 8.

The wireless communications manager 515 or its sub-components, may be implemented in hardware, code (e.g., software or firmware) executed by a processor, or any combination thereof. If implemented in code executed by a processor, the functions of the wireless communications manager 515, or its subcomponents, may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communications manager 515 or its sub-components, may be physically located at various positions, including being distributed such that portions of functions are implemented at different physical locations by one or more physical devices. In some examples, the wireless communications manager 515 or its sub-components may be a separate and distinct component in accordance with various aspects of the present disclosure. In some examples, the wireless communications manager 515 or its sub-components may be combined with one or more other hardware components, including but not limited to an input/output (I/O) component, a transceiver, a network server, another computing device, one or more other components described in the present disclosure, or a combination thereof, in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
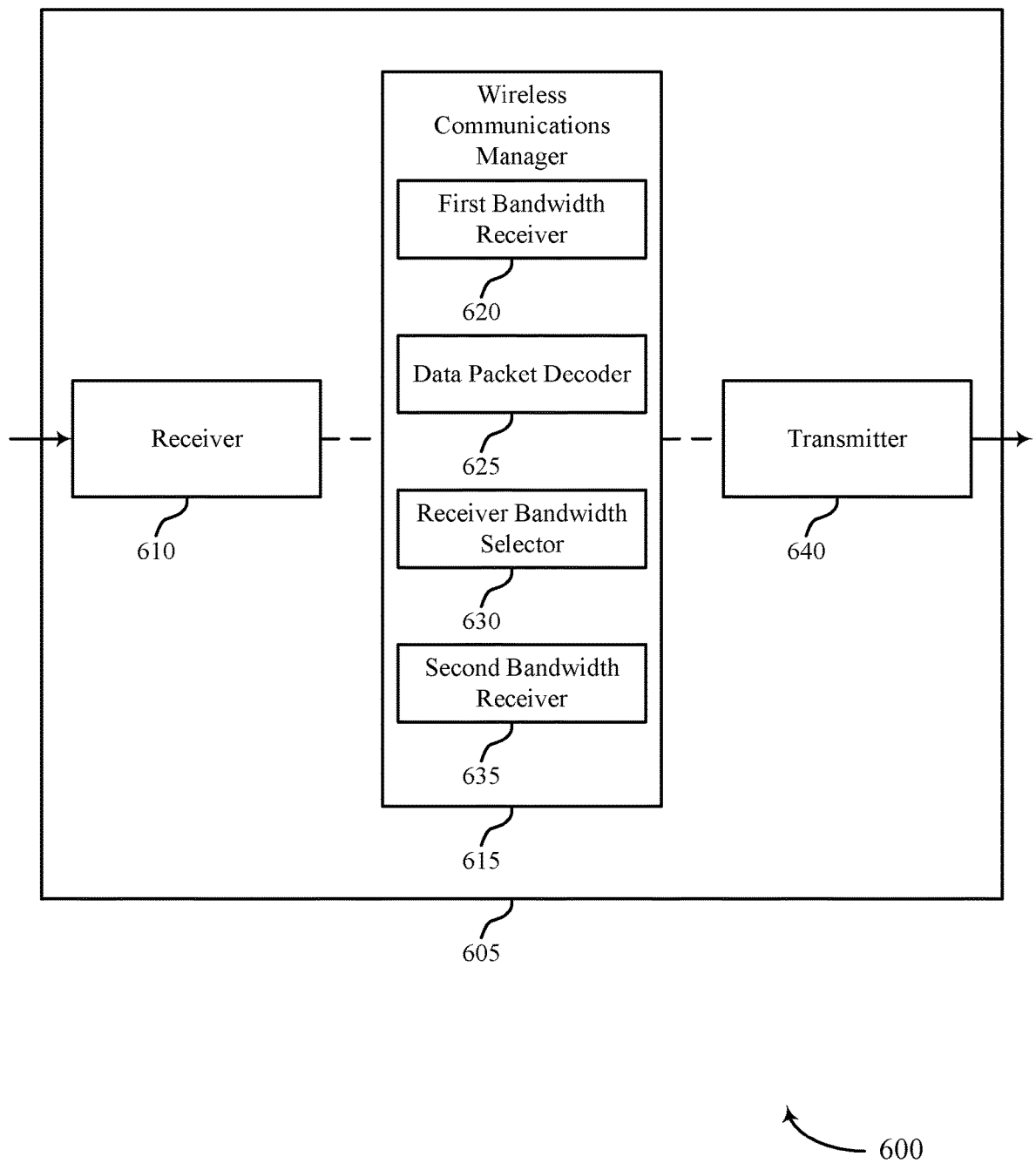

FIG. 6 shows a block diagram 600 of a device 605 that supports dynamic monitoring and scheduling in retransmission in accordance with aspects of the present disclosure. The device 605 may be an example of aspects of a device 505 or a UE 115 as described with reference to FIGS. 1 and 5. The device 605 may include a receiver 610, a wireless communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to dynamic monitoring and scheduling in retransmission, etc.). Information may be passed on to other components of the device 605. The receiver 610 may be an example of aspects of the transceiver 820 described with reference to FIG. 8. The receiver 610 may utilize a single antenna or a set of antennas.

The wireless communications manager 615 may include a first bandwidth receiver 620, a data packet decoder 625, a receiver bandwidth selector 630, and a second bandwidth receiver 635. The wireless communications manager 615 may be an example of aspects of the wireless communications manager 810 described with reference to FIG. 8.

The first bandwidth receiver 620 may monitor a first receiver bandwidth for downlink transmissions and receive a data transmission in the first receiver bandwidth.

The data packet decoder 625 may determine that a data packet of the data transmission was unsuccessfully decoded.

The receiver bandwidth selector 630 may switch to monitor a second receiver bandwidth that is wider than the first receiver bandwidth or narrower than the first receiver bandwidth, the switching based on determining that the data packet was unsuccessfully decoded.

The second bandwidth receiver 635 may receive a retransmission of the data packet in the second receiver bandwidth.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
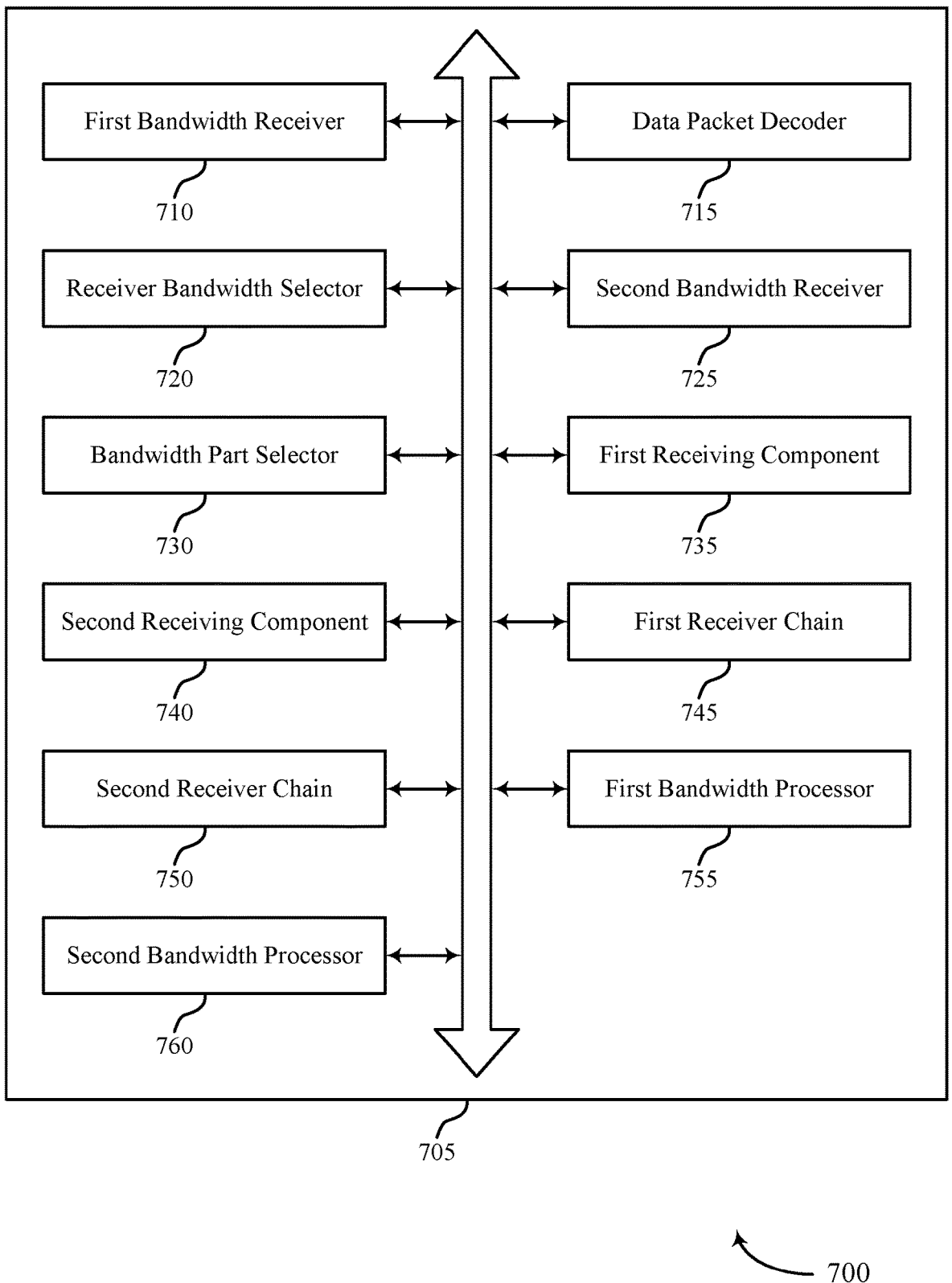
FIG. 7 show a block diagram of a wireless communications manager that supports dynamic monitoring and scheduling in retransmission in accordance with aspects of the present disclosure.

FIG. 7 shows a block diagram 700 of a wireless communications manager 705 that supports dynamic monitoring and scheduling in retransmission in accordance with aspects of the present disclosure. The wireless communications manager 705 may be an example of aspects of a wireless communications manager 515, a wireless communications manager 615, or a wireless communications manager 810 described with reference to FIGS. 5, 6, and 8. The wireless communications manager 705 may include a first bandwidth receiver 710, a data packet decoder 715, a receiver bandwidth selector 720, a second bandwidth receiver 725, a bandwidth part selector 730, a first receiving component 735, a second receiving component 740, a first receiver chain 745, a second receiver chain 750, a first bandwidth processor 755, and a second bandwidth processor 760. Each of these modules may communicate, directly or indirectly, with one another (e.g., via one or more buses).

The first bandwidth receiver 710 may monitor a first receiver bandwidth for downlink transmissions and receive a data transmission in the first receiver bandwidth. In some examples, receiving the data transmission includes receiving the data transmission on a first bandwidth part. In some examples, the first bandwidth receiver 710 may receive a subsequent data transmission in the first receiver bandwidth. In some examples, receiving the subsequent data transmission includes receiving the subsequent data transmission on the first bandwidth part. In some examples, receiving the subsequent data transmission includes receiving the subsequent data transmission on a second bandwidth part based on determining that the retransmission of the data packet received on the second bandwidth part was successfully decoded.

The data packet decoder 715 may determine that a data packet of the data transmission was unsuccessfully decoded. In some examples, the data packet decoder 715 may determine that a retransmission of a data packet was successfully decoded.

The receiver bandwidth selector 720 may switch to monitor a second receiver bandwidth that is wider than the first receiver bandwidth or narrower than the first receiver bandwidth, the switching based on determining that the data packet was unsuccessfully decoded. In some examples, switching to monitor the second receiver bandwidth includes switching from the first bandwidth part to monitor one or more different bandwidth parts, and the one or more different bandwidth parts may be non-overlapping with the first bandwidth part in the frequency domain. In some examples, the receiver bandwidth selector 720 may switch to monitor the first receiver bandwidth based on determining that a retransmission of a data packet was successfully decoded. In some cases, the second receiver bandwidth is wider than the first receiver bandwidth.

The second bandwidth receiver 725 may receive, at the UE, a retransmission of a data packet in the second receiver bandwidth. In some examples, receiving the retransmission of the data packet includes receiving the retransmission of the data packet on a second bandwidth part.

In some examples, the bandwidth part selector 730 may receive an indication of a first bandwidth part for receiving the data transmission, where receiving in the first receiver bandwidth is based on the indicated first bandwidth part. In some examples, the bandwidth part selector 730 may receive an indication of a second bandwidth part for receiving a subsequent data transmission, where receiving the subsequent data transmission includes receiving the subsequent data transmission on the indicated second bandwidth part. In some examples, the bandwidth part selector 730 may receive a configuration message designating the second receiver bandwidth for retransmissions of data, where switching to monitor the second receiver bandwidth may be based on the configuration message.

The first receiving component 735 may receive in the first receiver bandwidth. The second receiving component 740 may receive in the second receiver bandwidth. In some examples, switching to monitor the second receiver bandwidth includes switching from using the first receiving component 735 to using the second receiving component 740. In some examples, the second receiving component 740 is associated with a bandwidth that is wider than a bandwidth of the first receiving component 735. Although illustrated as being a component of the wireless communications manager 705, in other examples the first receiving component 735, the second receiving component 740, or both, may be part of another portion of a device (e.g., a receiver, such as a receiver 510, a receiver 610, or a transceiver 820 described with reference to FIGS. 5, 6, and 8).

The first receiver chain 745 may receive in the first receiver bandwidth. The second receiver chain 750 may receive in the second receiver bandwidth. In some examples, switching to monitor the second receiver bandwidth includes switching from using the first receiver chain 745 to using the second receiver chain 750. In some examples, the second receiver chain 750 is associated with a bandwidth that is wider than a bandwidth associated with the first receiver chain 745. Although illustrated as being a component of the wireless communications manager 705, in other examples the first receiver chain 745, the second receiver chain 750, or both, may be part of another portion of a device (e.g., a receiver, such as a receiver 510, a receiver 610, or a transceiver 820 described with reference to FIGS. 5, 6, and 8).

The first bandwidth processor 755 may process received signals according to a first processing bandwidth. The second bandwidth processor 760 may process received signals according to a second processing bandwidth. In some examples, switching to monitor the second receiver bandwidth includes switching from using the first bandwidth processor 755 to using the second bandwidth processor 760. In some examples, the second bandwidth processor 760 is associated with a bandwidth that is wider than a bandwidth associated with the first bandwidth processor 755. Although illustrated as being a component of the wireless communications manager 705, in other examples the first bandwidth processor 755, the second bandwidth processor 760, or both, may be part of another portion of a device (e.g., a receiver, such as a receiver 510, a receiver 610, or a transceiver 820 described with reference to FIGS. 5, 6, and 8).

Figure 8:
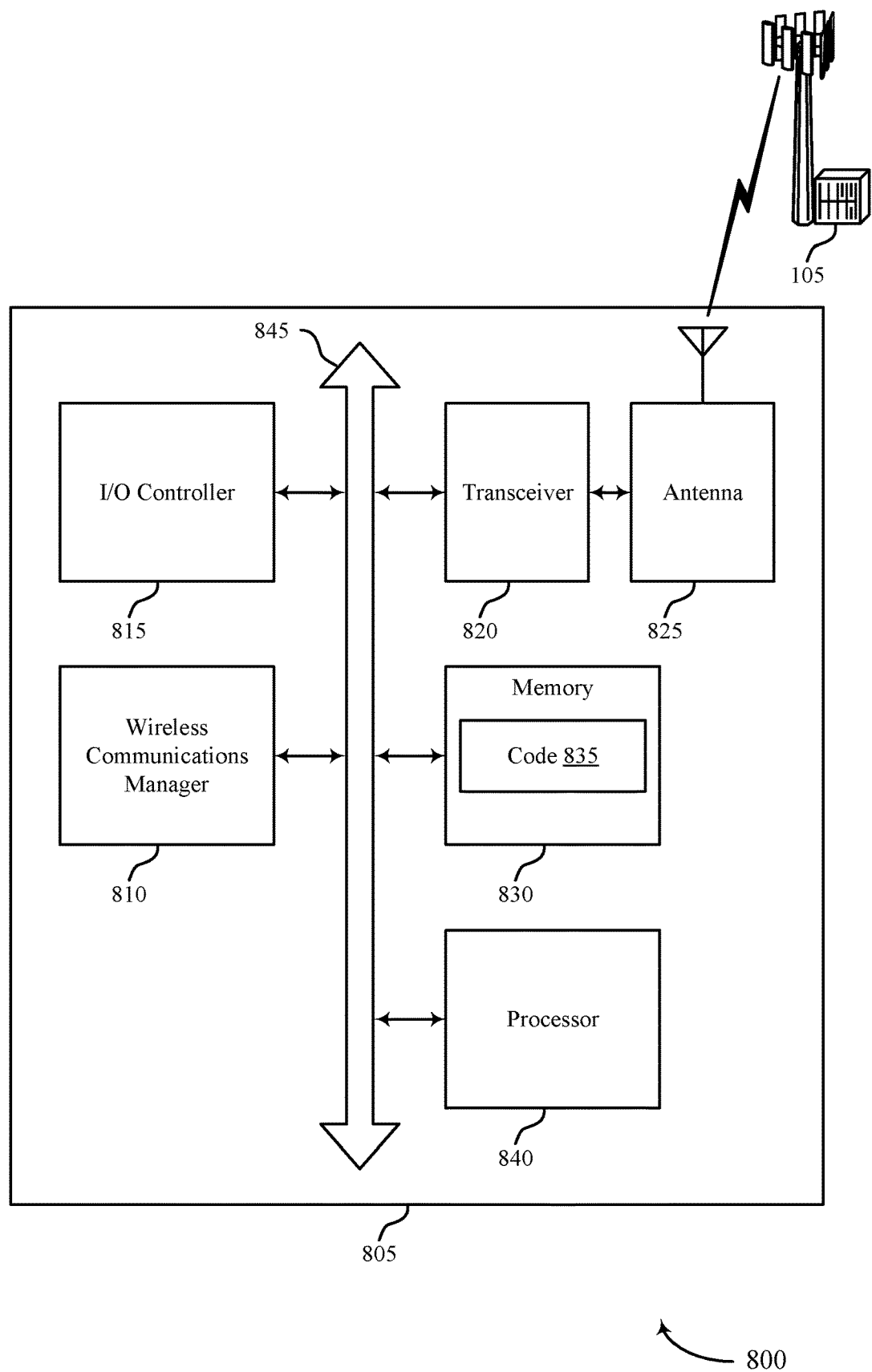
FIG. 8 illustrates a block diagram of a system including a device that supports dynamic monitoring and scheduling in retransmission in accordance with aspects of the present disclosure.

FIG. 8 shows a diagram of a system 800 including a device 805 that supports dynamic monitoring and scheduling in retransmission in accordance with aspects of the present disclosure. The device 805 may be an example of or include the components of a device 505, a device 605, or a UE 115 as described herein, e.g., with reference to FIGS. 1 through 6. The device 805 may include components for bi-directional voice and data communications including components for transmitting and receiving communications, including a wireless communications manager 810, an I/O controller 815, a transceiver 820, an antenna 825, a memory 830, and a processor 840. These components may be in electronic communication via one or more buses (e.g., a bus 845).

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some examples the transceiver 820 may include components that may be selected or otherwise enabled to support a relatively narrow receiver bandwidth and a relatively wide receiver bandwidth in accordance with aspects of the present disclosure.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by the processor, may cause the device 805 to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to perform various functions (e.g., functions or operations supporting dynamic monitoring and scheduling in retransmission).

Figure 9:
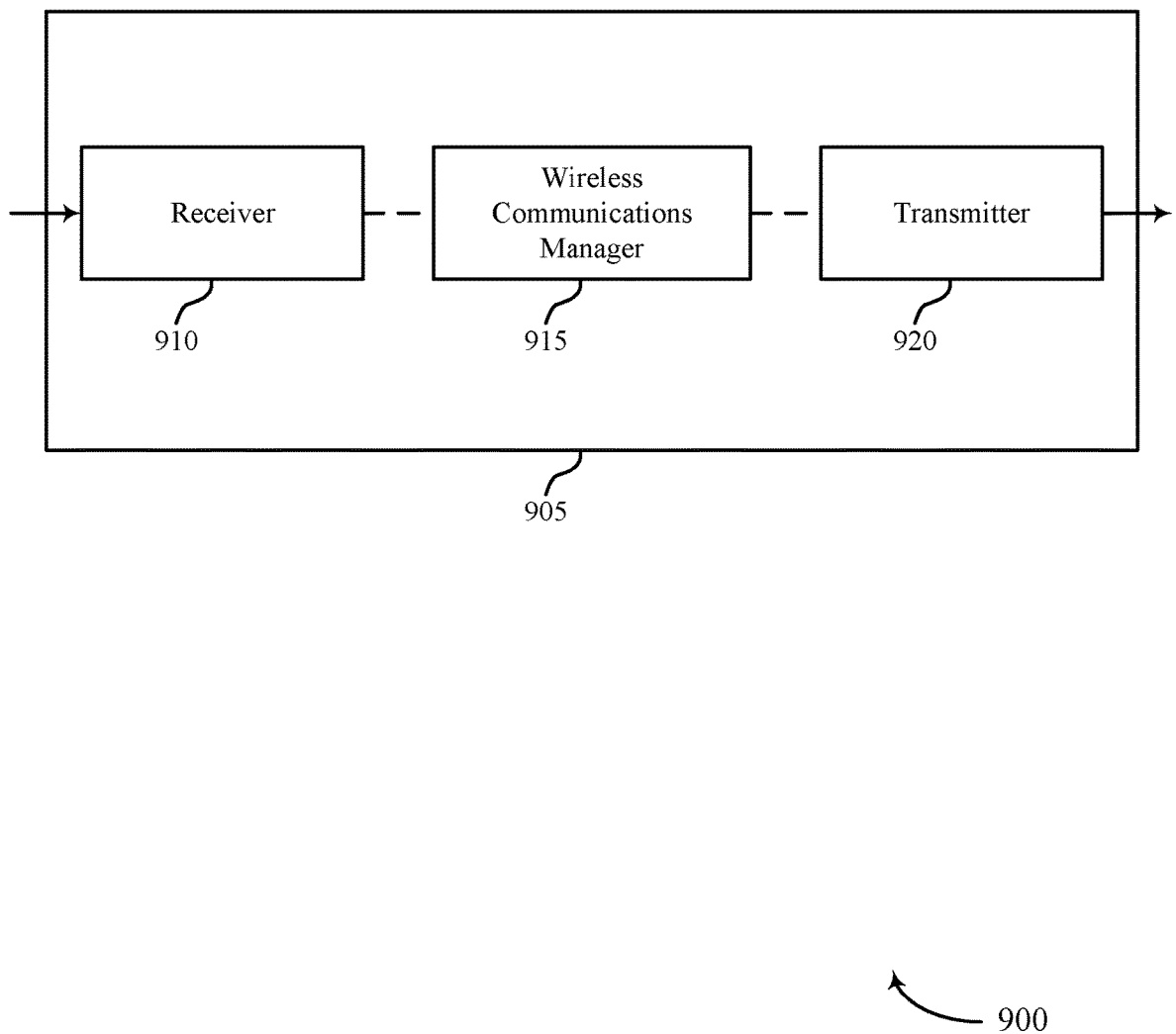
FIGS. 9 and 10 show block diagrams of devices that support dynamic monitoring and scheduling in retransmission in accordance with aspects of the present disclosure.

FIG. 9 shows a block diagram 900 of a device 905 that supports dynamic monitoring and scheduling in retransmission in accordance with aspects of the present disclosure. The device 905 may be an example of aspects of a base station 105 as described herein. The device 905 may include a receiver 910, a wireless communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic monitoring and scheduling in retransmission, etc.). Information may be passed on to other components of the device 905. The receiver 910 may be an example of aspects of the transceiver 1220 described with reference to FIG. 12. The receiver 910 may utilize a single antenna or a set of antennas.

The wireless communications manager 915 may schedule a data transmission according to a first receiver bandwidth, receive an indication that a data packet of the data transmission was unsuccessfully decoded, and schedule a retransmission of the data packet, based on the indication that the data packet was unsuccessfully decoded, according to a second receiver bandwidth that is wider than the first receiver bandwidth or narrower than the first receiver bandwidth. The wireless communications manager 915 may be an example of aspects of the wireless communications manager 1210 described with reference to FIG. 12.

The wireless communications manager 915, or its sub-components, may be implemented in hardware, code (e.g., software or firmware) executed by a processor, or any combination thereof. If implemented in code executed by a processor, the functions of the wireless communications manager 915, or its sub-components, may be executed by a general-purpose processor, a DSP, an ASIC, an FPGA or other programmable logic device, discrete gate or transistor logic, discrete hardware components, or any combination thereof designed to perform the functions described in the present disclosure.

The wireless communications manager 915, or its sub-components, may be physically located at various positions, including being distributed such that portions of functions are implemented at different physical locations by one or more physical devices. In some examples, the wireless communications manager 915, or its sub-components, may be a separate and distinct component in accordance with various aspects of the present disclosure. In some examples, the wireless communications manager 915, or its sub-components, may be combined with one or more other hardware components, including but not limited to an input/output (I/O) component, a transceiver, a network server, another computing device, one or more other components described in the present disclosure, or a combination thereof, in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
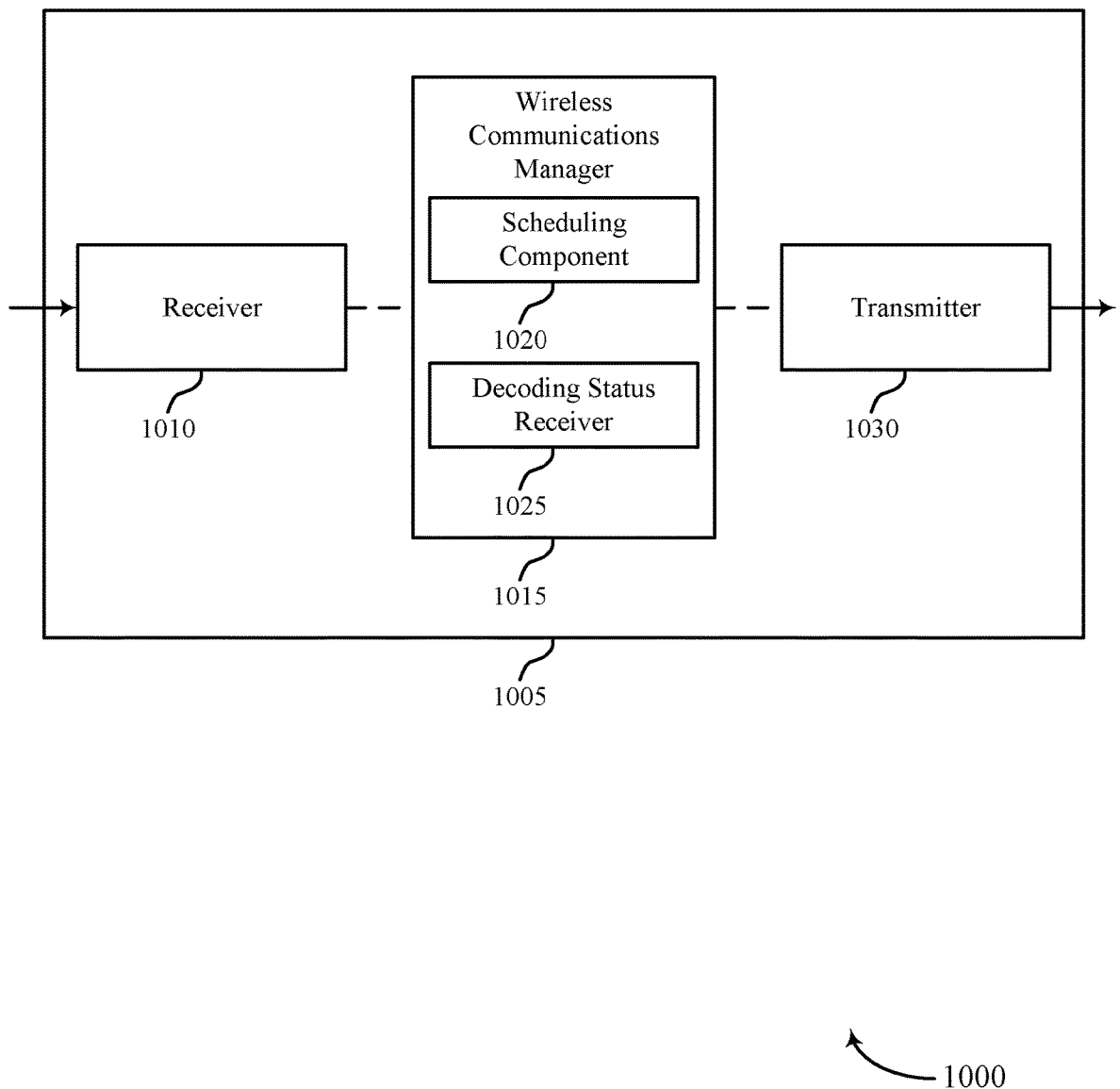

FIG. 10 shows a block diagram 1000 of a device 1005 that supports dynamic monitoring and scheduling in retransmission in accordance with aspects of the present disclosure. The device 1005 may be an example of aspects of a device 905 or a base station 105 as described with reference to FIGS. 1 and 9. The device 1005 may include a receiver 1010, a wireless communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic monitoring and scheduling in retransmission, etc.). Information may be passed on to other components of the device 1005. The receiver 1010 may be an example of aspects of the transceiver 1220 described with reference to FIG. 12. The receiver 1010 may utilize a single antenna or a set of antennas.

The wireless communications manager 1015 may include a scheduling component 1020 and a decoding status receiver 1025. The wireless communications manager 1015 may be an example of aspects of the wireless communications manager 1210 described with reference to FIG. 12.

The scheduling component 1020 may schedule a data transmission according to a first receiver bandwidth. The scheduling component 1020 may also schedule a retransmission of the data packet, based on an indication that the data packet was unsuccessfully decoded, according to a second receiver bandwidth that is wider than the first receiver bandwidth or narrower than the first receiver bandwidth.

The decoding status receiver 1025 may receive an indication that a data packet of the data transmission was unsuccessfully decoded.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
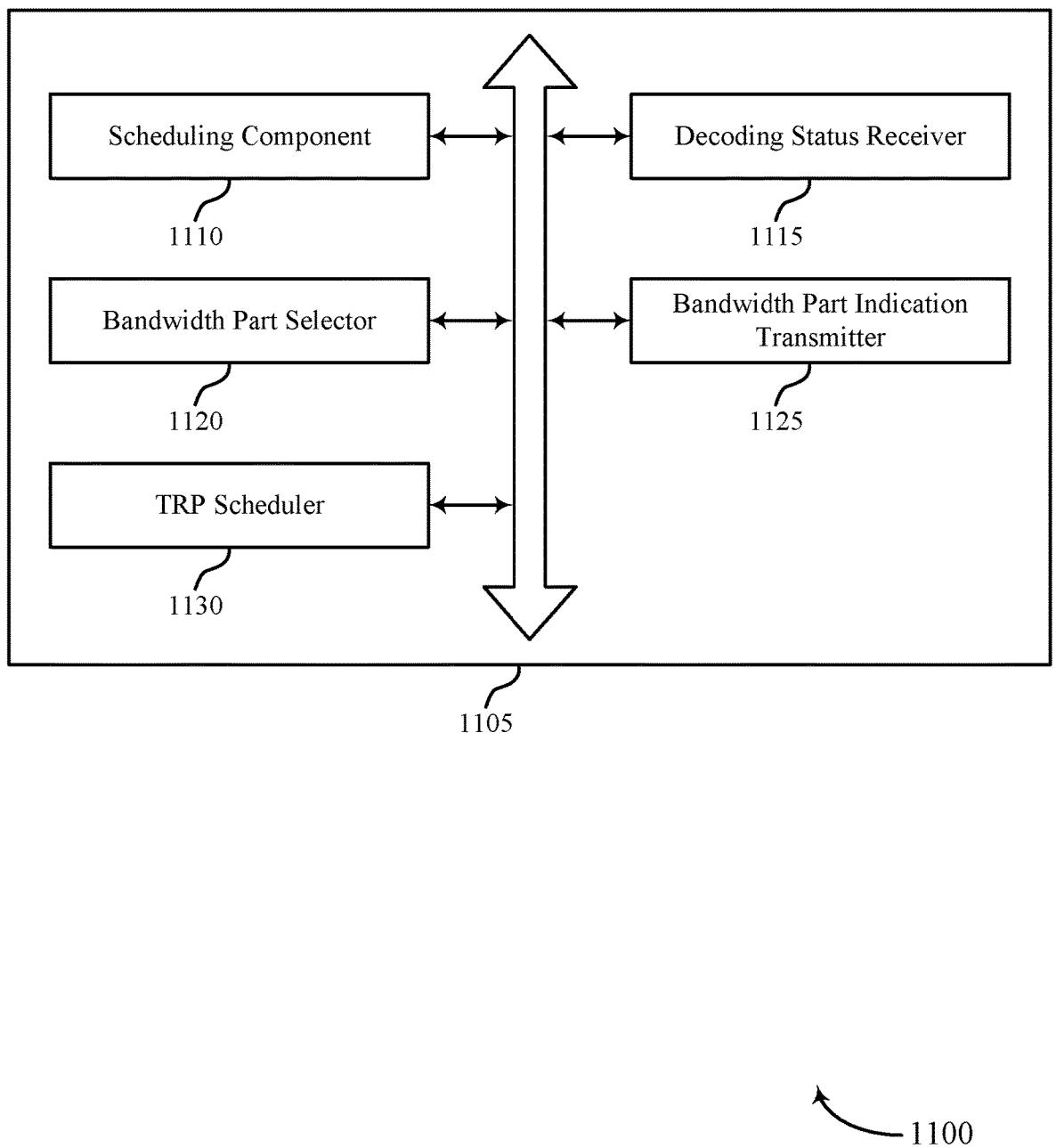
FIG. 11 show a block diagram of a wireless communications manager that supports dynamic monitoring and scheduling in retransmission in accordance with aspects of the present disclosure.

FIG. 11 shows a block diagram 1100 of a wireless communications manager 1105 that supports dynamic monitoring and scheduling in retransmission in accordance with aspects of the present disclosure. The wireless communications manager 1105 may be an example of aspects of a wireless communications manager 915, a wireless communications manager 1015, or a wireless communications manager 1210 described with reference to FIGS. 9, 10, and 12. The wireless communications manager 1105 may include a scheduling component 1110, a decoding status receiver 1115, a bandwidth part selector 1120, a bandwidth part indication transmitter 1125, and TRP scheduler 1130. Each of these modules may communicate, directly or indirectly, with one another (e.g., via one or more buses).

The scheduling component 1110 may schedule a data transmission for a UE according to a first receiver bandwidth. In some examples, the scheduling component 1110 may schedule a retransmission of the data packet to the UE, based on the indication that the data packet was unsuccessfully decoded, according to a second receiver bandwidth that is wider than the first receiver bandwidth or narrower than the first receiver bandwidth. In some examples, the scheduling component 1110 may schedule a subsequent data transmission for the UE, based on the indication that the retransmission of the data packet was successfully decoded, according to the first receiver bandwidth.

In some examples, the scheduling component 1110 may schedule the data transmission on a first bandwidth part. In some examples, the scheduling component 1110 may schedule the retransmission of the data packet on a second bandwidth part that is different from the first bandwidth part based on the indication that the data packet was unsuccessfully decoded. In some examples, the scheduling component 1110 may schedule the retransmission of the data packet on two or more bandwidth parts based on the indication that the data packet was unsuccessfully decoded. In some examples, the scheduling component 1110 may schedule the retransmission of the data packet on the selected one of more of the identified set of bandwidth parts. In some cases, the second receiver bandwidth is wider than the first receiver bandwidth.

The decoding status receiver 1115 may receive an indication that a data packet of the data transmission was unsuccessfully decoded by the UE. In some examples, the decoding status receiver 1115 may receive an indication that the retransmission of the data packet was successfully decoded by the UE. In some examples, the decoding status receiver 1115 may receive the indication that the retransmission of the data packet was successfully decoded indicates that the retransmission of the data packet was received on a second bandwidth part.

The bandwidth part selector 1120 may schedule the subsequent data transmission according to the first receiver bandwidth includes scheduling the subsequent data transmission to be transmitted on the second bandwidth part based on the received indication that the retransmission of the data packet was successfully decoded. In some examples, scheduling the data transmission according to the first receiver bandwidth includes scheduling the data transmission to be transmitted on first bandwidth part. In some examples, scheduling a subsequent data transmission according to the first receiver bandwidth includes scheduling the subsequent data transmission to be transmitted on the first bandwidth part.

In some examples, the bandwidth part selector 1120 may identify a set of bandwidth parts. In some examples, the bandwidth part selector 1120 may select one or more of the identified set of bandwidth parts for the retransmission of the data packet. In some examples, the identified set of bandwidth parts are non-overlapping with the first bandwidth part in the frequency domain.

In some examples, the bandwidth part indication transmitter 1125 may transmit an indication of the first bandwidth part for the UE to receive the data transmission. In some examples, the bandwidth part indication transmitter 1125 may transmit an indication of a second bandwidth part for the UE to receive the subsequent data transmission. In some examples, the bandwidth part indication transmitter 1125 may transmit a configuration message to the UE designating the second receiver bandwidth for retransmissions of data.

The TRP scheduler 1130 may schedule the data transmission according to the first receiver bandwidth by scheduling the data transmission to be transmitted from a first TRP. In some examples, scheduling a retransmission of the data packet according to the second receiver bandwidth includes scheduling the retransmission of the data packet to be transmitted from a second TRP that is different from the first TRP based on an indication that the data packet was unsuccessfully decoded.

Figure 12:
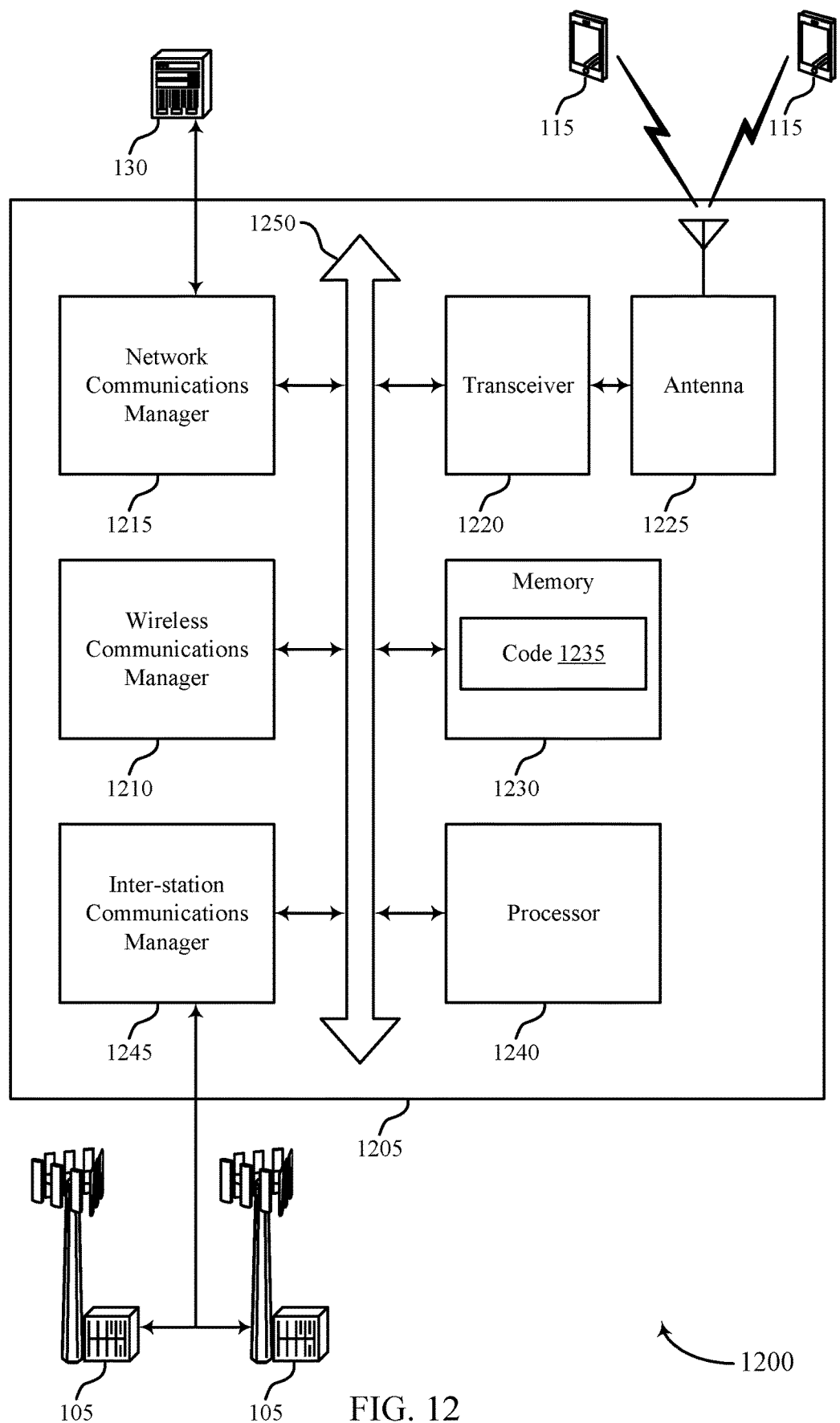
FIG. 12 illustrates a block diagram of a system including a device that supports dynamic monitoring and scheduling in retransmission in accordance with aspects of the present disclosure.

FIG. 12 shows a diagram of a system 1200 including a device 1205 that supports dynamic monitoring and scheduling in retransmission in accordance with aspects of the present disclosure. The device 1205 may be an example of or include the components of a device 905, a device 1005, or a base station 105 as described herein, e.g., with reference to FIGS. 1 through 4, 9, and 10. The device 1205 may include components for bi-directional voice and data communications including components for transmitting and receiving communications, including a wireless communications manager 1210, a network communications manager 1215, a transceiver 1220, an antenna 1225, a memory 1230, a processor 1240, and an inter-station communications manager 1245. These components may be in electronic communication via one or more buses (e.g., a bus 1250).

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into processor 1240. The processor 1240 may be configured to execute computer-readable instructions stored in a memory (e.g., the memory 1230) to perform various functions (e.g., functions or tasks supporting dynamic monitoring and scheduling in retransmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
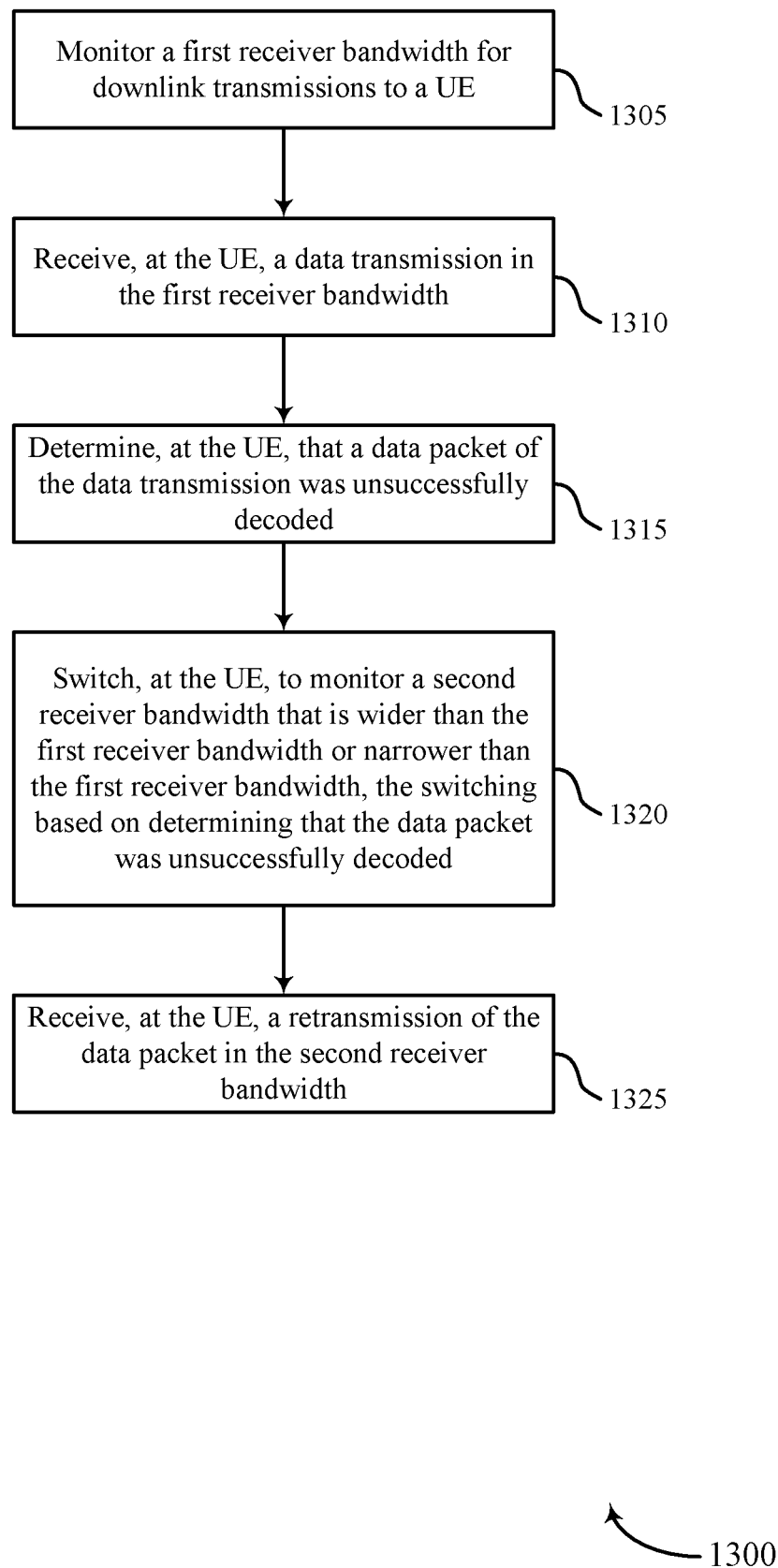
FIGS. 13 through 16 show flowcharts illustrating methods for dynamic monitoring and scheduling in retransmission in accordance with aspects of the present disclosure.

FIG. 13 shows a flowchart illustrating a method 1300 for dynamic monitoring and scheduling in retransmission in accordance with aspects of the present disclosure. In some examples the operations of method 1300 may be implemented by a UE, or its components as described herein. For example, the operations of method 1300 may be performed by a wireless communications manager as described with reference to FIGS. 5 through 8. In some examples, a UE may execute a set of codes to control the functional elements of the device to perform the functions described below. Additionally or alternatively, the UE may perform aspects of the functions described below using special-purpose hardware. In various other examples, the method 1300 may be more generally performed by a device that receives data packets.

At 1305, the UE may monitor a first receiver bandwidth for downlink transmissions. The operations of 1305 may be performed according to the methods described herein. In some examples, aspects of the operations of 1305 may be performed by a first bandwidth receiver as described with reference to FIGS. 6 and 7.

At 1310, the UE may receive a data transmission in the first receiver bandwidth. The operations of 1310 may be performed according to the methods described herein. In some examples, aspects of the operations of 1310 may be performed by a first bandwidth receiver as described with reference to FIGS. 6 and 7.

At 1315, the UE may determine that a data packet of the data transmission was unsuccessfully decoded. The operations of 1315 may be performed according to the methods described herein. In some examples, aspects of the operations of 1315 may be performed by a data packet decoder as described with reference to FIGS. 6 and 7.

At 1320, the UE may switch to monitor a second receiver bandwidth that is wider than the first receiver bandwidth or narrower than the first receiver bandwidth, the switching based on determining that the data packet was unsuccessfully decoded. The operations of 1320 may be performed according to the methods described herein. In some examples, aspects of the operations of 1320 may be performed by a receiver bandwidth selector as described with reference to FIGS. 6 and 7.

At 1325, the UE may receive a retransmission of the data packet in the second receiver bandwidth. The operations of 1325 may be performed according to the methods described herein. In some examples, aspects of the operations of 1325 may be performed by a second bandwidth receiver as described with reference to FIGS. 6 and 7.

Figure 14:
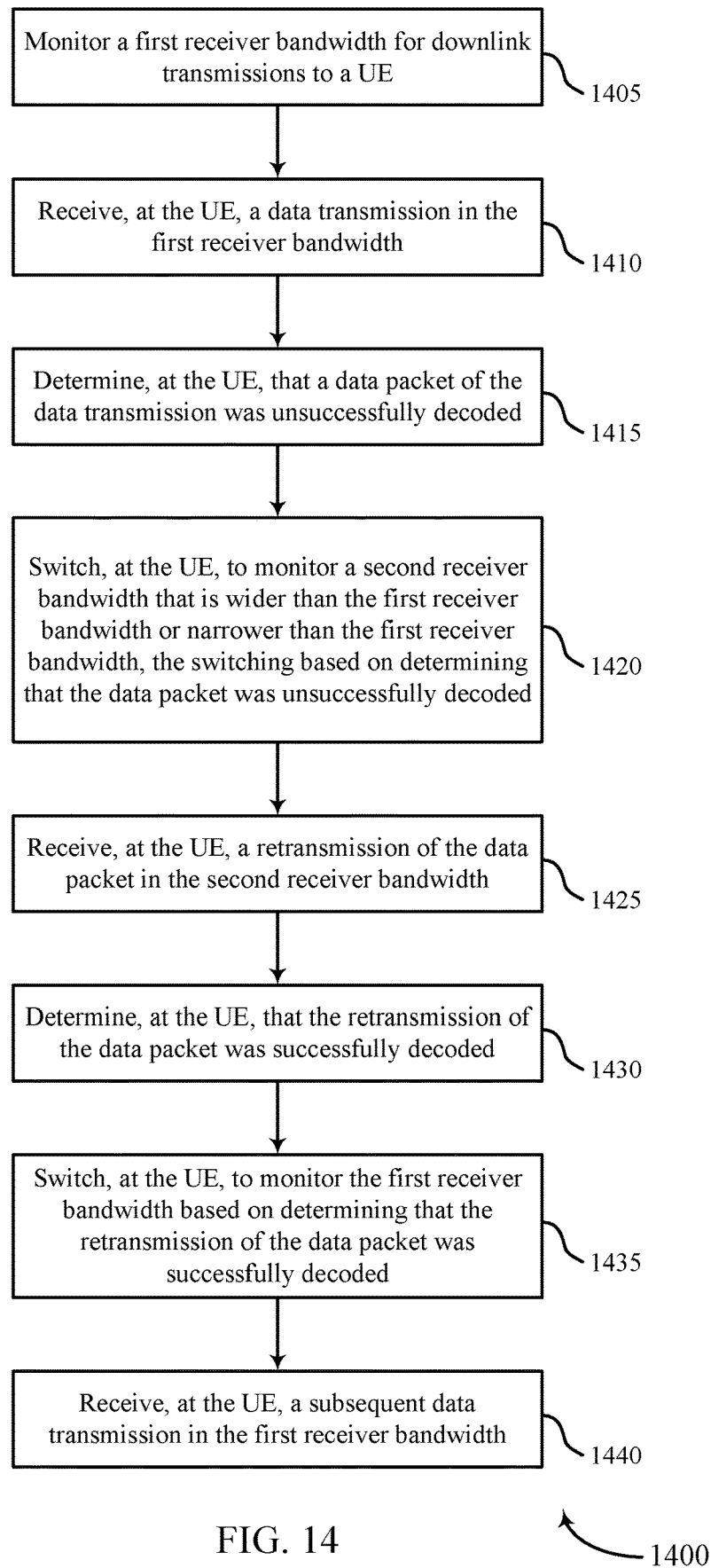

FIG. 14 shows a flowchart illustrating a method 1400 for dynamic monitoring and scheduling in retransmission in accordance with aspects of the present disclosure. The operations of method 1400 may be implemented by a UE or its components as described herein. For example, the operations of method 1400 may be performed by a wireless communications manager as described with reference to FIGS. 5 through 8. In some examples, a UE may execute a set of codes to control the functional elements of the device to perform the functions described below. Additionally or alternatively, the UE may perform aspects of the functions described below using special-purpose hardware. In various other examples, the method 1400 may be more generally performed by a device that receives data packets.

At 1405 the UE may monitor a first receiver bandwidth for downlink transmissions. The operations of 1405 may be performed according to the methods described herein. In some examples, aspects of the operations of 1405 may be performed by a first bandwidth receiver as described with reference to FIGS. 6 and 7.

At 1410 the UE may receive a data transmission in the first receiver bandwidth. The operations of 1410 may be performed according to the methods described herein. In some examples, aspects of the operations of 1410 may be performed by a first bandwidth receiver as described with reference to FIGS. 6 and 7.

At 1415 the UE may determine that a data packet of the data transmission was unsuccessfully decoded. The operations of 1415 may be performed according to the methods described herein. In some examples, aspects of the operations of 1415 may be performed by a data packet decoder as described with reference to FIGS. 6 and 7.

At 1420 the UE may switch to monitor a second receiver bandwidth that is wider than the first receiver bandwidth or narrower than the first receiver bandwidth, the switching based on determining that the data packet was unsuccessfully decoded. The operations of 1420 may be performed according to the methods described herein. In some examples, aspects of the operations of 1420 may be performed by a receiver bandwidth selector as described with reference to FIGS. 6 and 7.

At 1425 the UE may receive a retransmission of the data packet in the second receiver bandwidth. The operations of 1425 may be performed according to the methods described herein. In some examples, aspects of the operations of 1425 may be performed by a second bandwidth receiver as described with reference to FIGS. 6 and 7.

At 1430 the UE may determine that the retransmission of the data packet was successfully decoded. The operations of 1430 may be performed according to the methods described herein. In some examples, aspects of the operations of 1430 may be performed by a data packet decoder as described with reference to FIGS. 6 and 7.

At 1435 the UE may switch to monitor the first receiver bandwidth based on determining that the retransmission of the data packet was successfully decoded. The operations of 1435 may be performed according to the methods described herein. In some examples, aspects of the operations of 1435 may be performed by a receiver bandwidth selector as described with reference to FIGS. 6 and 7.

At 1440 the UE may receive a subsequent data transmission in the first receiver bandwidth. The operations of 1440 may be performed according to the methods described herein. In some examples, aspects of the operations of 1440 may be performed by a first bandwidth receiver as described with reference to FIGS. 6 and 7.

Figure 15:
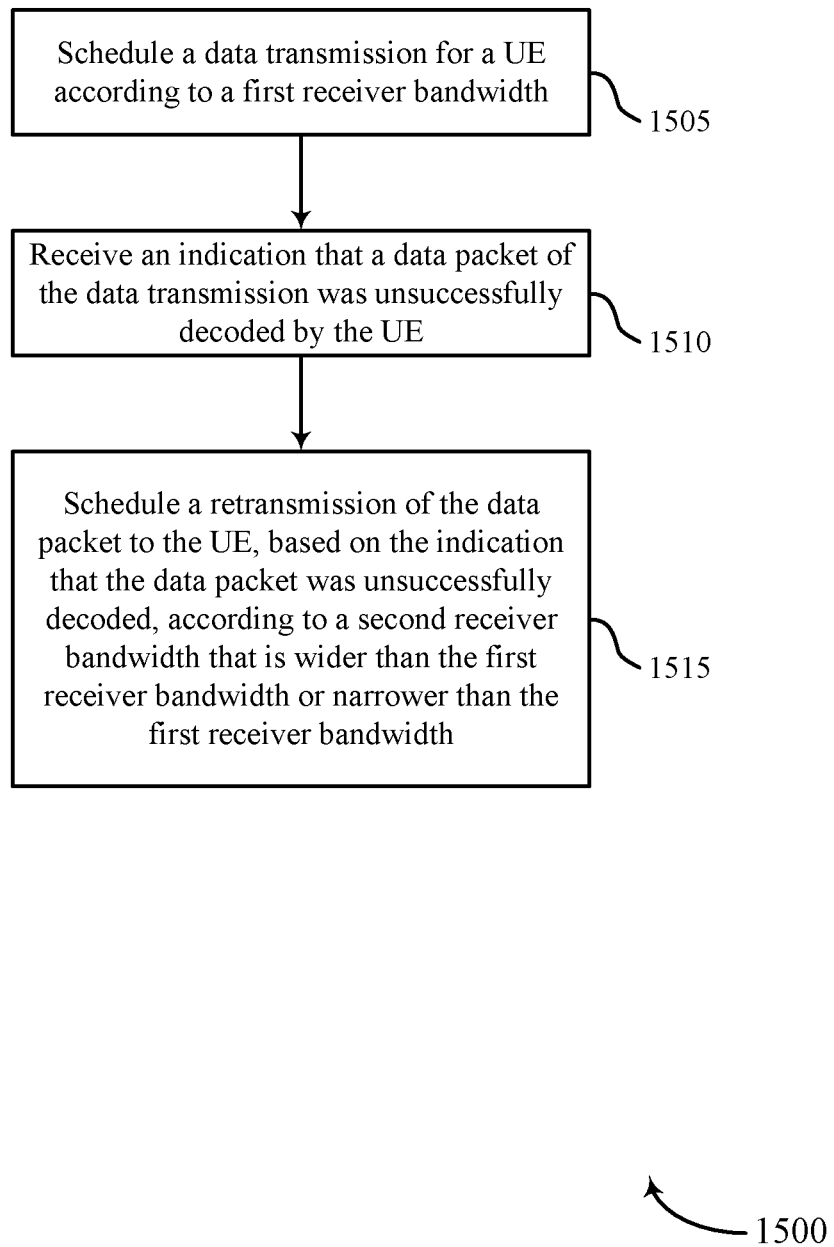

FIG. 15 shows a flowchart illustrating a method 1500 for dynamic monitoring and scheduling in retransmission in accordance with aspects of the present disclosure. The operations of method 1500 may be implemented by a base station or its components as described herein. For example, the operations of method 1500 may be performed by a wireless communications manager as described with reference to FIGS. 9 through 12. In some examples, a base station may execute a set of codes to control the functional elements of the device to perform the functions described below. Additionally or alternatively, the base station may perform aspects of the functions described below using special-purpose hardware. In various other examples, the method 1500 may be more generally performed by a device that schedules and transmits data packets.

At 1505 the base station may schedule a data transmission for a UE according to a first receiver bandwidth. The operations of 1505 may be performed according to the methods described herein. In some examples, aspects of the operations of 1505 may be performed by a scheduling component as described with reference to FIGS. 10 and 11.

At 1510 the base station may receive an indication that a data packet of the data transmission was unsuccessfully decoded by the UE. The operations of 1510 may be performed according to the methods described herein. In some examples, aspects of the operations of 1510 may be performed by a decoding status receiver as described with reference to FIGS. 10 and 11.

At 1515 the base station may schedule a retransmission of the data packet to the UE, based on the indication that the data packet was unsuccessfully decoded, according to a second receiver bandwidth that is wider than the first receiver bandwidth or narrower than the first receiver bandwidth. The operations of 1515 may be performed according to the methods described herein. In some examples, aspects of the operations of 1515 may be performed by a scheduling component as described with reference to FIGS. 9 through 12.

Figure 16:
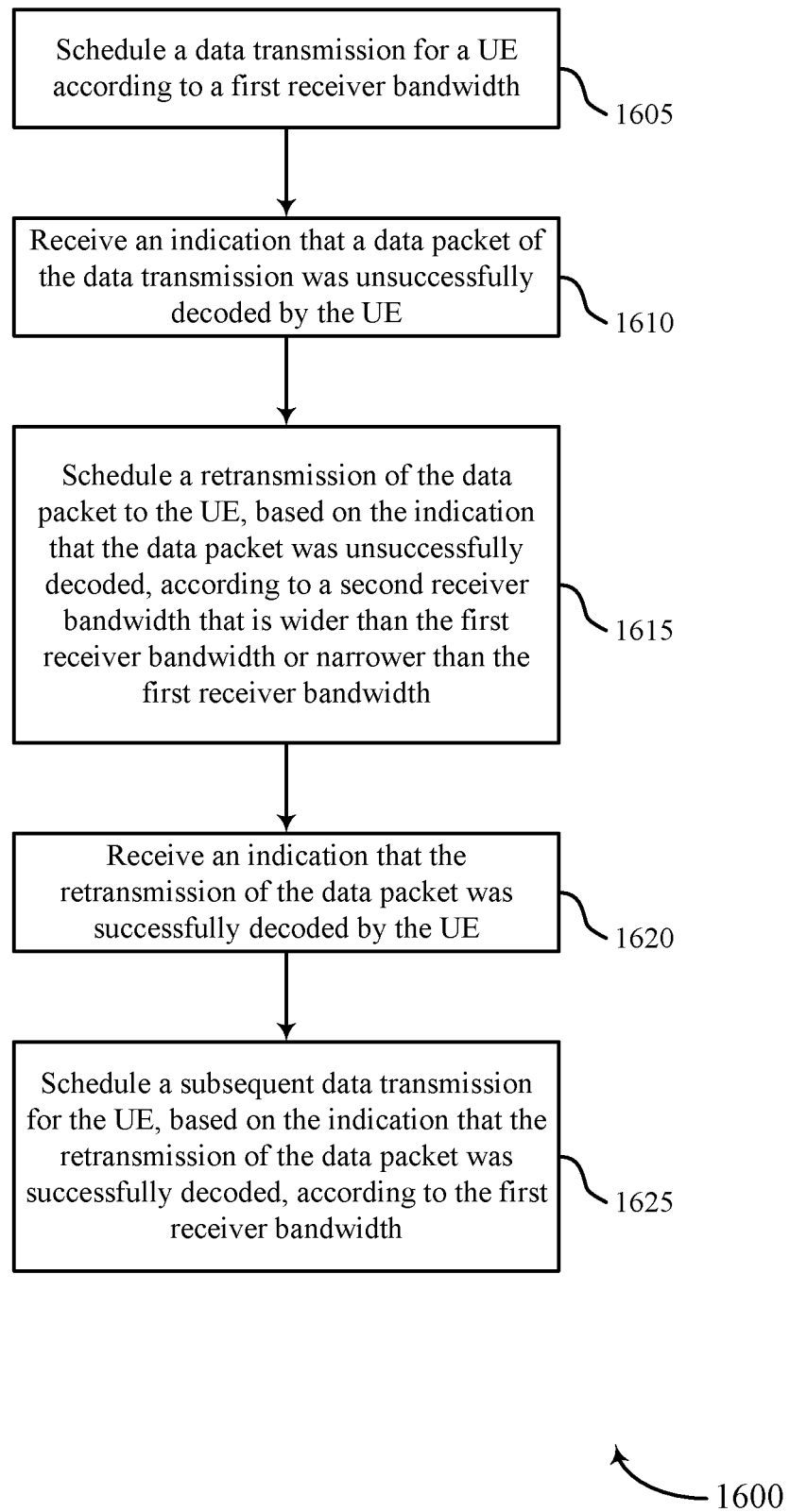

FIG. 16 shows a flowchart illustrating a method 1600 for dynamic monitoring and scheduling in retransmission in accordance with aspects of the present disclosure. The operations of method 1600 may be implemented by a base station or its components as described herein. For example, the operations of method 1600 may be performed by a wireless communications manager as described with reference to FIGS. 9 through 12. In some examples, a base station may execute a set of codes to control the functional elements of the device to perform the functions described below. Additionally or alternatively, the base station may perform aspects of the functions described below using special-purpose hardware. In various other examples, the method 1400 may be more generally performed by a device that schedules and transmits data packets.

At 1605 the base station may schedule a data transmission for a UE according to a first receiver bandwidth. The operations of 1605 may be performed according to the methods described herein. In some examples, aspects of the operations of 1605 may be performed by a scheduling component as described with reference to FIGS. 10 and 11.

At 1610 the base station may receive an indication that a data packet of the data transmission was unsuccessfully decoded by the UE. The operations of 1610 may be performed according to the methods described herein. In some examples, aspects of the operations of 1610 may be performed by a decoding status receiver as described with reference to FIGS. 10 and 11.

At 1615 the base station may schedule a retransmission of the data packet to the UE, based on the indication that the data packet was unsuccessfully decoded, according to a second receiver bandwidth that is wider than the first receiver bandwidth or narrower than the first receiver bandwidth. The operations of 1615 may be performed according to the methods described herein. In some examples, aspects of the operations of 1615 may be performed by a scheduling component as described with reference to FIGS. 10 and 11.

At 1620 the base station may receive an indication that the retransmission of the data packet was successfully decoded by the UE. The operations of 1620 may be performed according to the methods described herein. In some examples, aspects of the operations of 1620 may be performed by a decoding status receiver as described with reference to FIGS. 10 and 11.

At 1625 the base station may schedule a subsequent data transmission for the UE, based on the indication that the retransmission of the data packet was successfully decoded, according to the first receiver bandwidth. The operations of 1625 may be performed according to the methods described herein. In some examples, aspects of the operations of 1625 may be performed by a scheduling component as described with reference to FIGS. 10 and 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications performed by a user equipment (UE), comprising:
  receiving, from a base station, one or more configuration messages indicating a configuration for each of a plurality of bandwidth parts (BWPs) within a same carrier including a first BWP and one or more second BWPs;

monitoring the first BWP and no other BWPs of the plurality of BWPs, the first BWP having a first receiver bandwidth for downlink transmissions from the base station;
receiving, from the base station, a data transmission in the first receiver bandwidth based on the monitoring of the first BWP;
determining that a data packet of the data transmission was unsuccessfully decoded;
transmitting, to the base station, an indication that the data packet was unsuccessfully decoded based on the determining that the data packet was unsuccessfully decoded;
switching, based at least in part on the determining that the data packet was unsuccessfully decoded, from monitoring the first BWP to monitoring the one or more second BWPs within the carrier, the one or more monitored second BWPs having a total receiver bandwidth that is wider than the first receiver bandwidth; and
receiving a retransmission of the data packet in one or more of the one or more monitored second BWPs based on the monitoring of the one or more second BWPs.

2. The method of claim 1, further comprising:
receiving a configuration message designating the one or more second BWPs or the total receiver bandwidth for retransmissions of data, wherein the switching to monitor the one or more second BWPs is based at least in part on the configuration message designating the one or more second BWPs or the second receiver bandwidth for retransmissions of data.

3. The method of claim 1, wherein the one or more second BWPs consist of a single BWP having the total receiver bandwidth that is wider than the first receiver bandwidth.

4. The method of claim 1, wherein the one or more second BWPs are non-overlapping with the first BWP in the frequency domain.

5. The method of claim 1, further comprising:
determining that the retransmission of the data packet was successfully decoded;
switching, from monitoring the one or more second BWPs to monitoring a single BWP of the plurality of BWPs and no other BWP of the plurality of BWPs based at least in part on determining that the retransmission of the data packet was successfully decoded, the single BWP having the first receiver bandwidth; and
receiving a subsequent data transmission in the single BWP based on the monitoring of the single BWP.

6. The method of claim 5, wherein the single BWP is the first BWP.

7. The method of claim 5, wherein the single BWP is a single one of the one or more second BWPs.

8. The method of claim 5, further comprising:
receiving an indication that the single BWP is to be used for receiving the subsequent data transmission.

9. The method of claim 1, further comprising:
receiving an indication that the first BWP is to be used for receiving the data transmission.

10. The method of claim 1, wherein:
receiving the data transmission in the first BWP comprises using a first receiving component having a first bandwidth; and
switching to monitor the one or more second BWPs comprises switching from the first receiving component to a second receiving component having a second bandwidth that is wider than the first bandwidth based at least in part on determining that the data packet was unsuccessfully decoded.

11. The method of claim 1, wherein:
receiving the data transmission in the first BWP comprises using a first receiver chain having a first bandwidth; and
switching to monitor the one or more second BWPs comprises switching from the first receiver chain to a second receiver chain having a second bandwidth that is wider than the first bandwidth based at least in part on determining that the data packet was unsuccessfully decoded.

12. The method of claim 1, wherein:
receiving the data transmission in the first BWP comprises processing received signals according to a first processing bandwidth; and
switching to monitor the one or more second BWPs comprises switching from the first processing bandwidth to a second processing bandwidth that is wider than the first processing bandwidth based at least in part on determining that the data packet was unsuccessfully decoded.

13. The method of claim 1, wherein the first BWP and each of the one or more second BWPs are associated with the same transmission time interval (TTI) durations.

14. A method for wireless communications performed by a base station, comprising:
transmitting, to a user equipment (UE), one or more configuration messages indicating a configuration for each of a plurality of bandwidth parts (BWPs) within a same carrier including a first BWP and one or more second BWPs;
transmitting a data packet to the UE in the first BWP and no other BWPs of the plurality of BWPs, the first BWP having a first receiver bandwidth;
receiving, from the UE, an indication that the data packet was unsuccessfully decoded by the UE; and
retransmitting the data packet to the UE, based at least in part on the indication that the data packet was unsuccessfully decoded, in the one or more second BWPs within the carrier, the one or more second BWPs having a total receiver bandwidth that is wider than the first receiver bandwidth.

15. The method of claim 14, further comprising:
transmitting a configuration message to the UE designating the one or more second BWPs or the total receiver bandwidth for retransmissions of data.

16. The method of claim 14, wherein the one or more second BWPs consist of a single BWP having the total receiver bandwidth that is wider than the first receiver bandwidth.

17. The method of claim 14, further comprising:
receiving, from the UE, an indication that the retransmission of the data packet was successfully decoded by the UE; and
transmitting a subsequent data transmission to the UE in a single BWP of the plurality of BWPs and no other BWP of the plurality of BWPs based at least in part on the indication that the retransmission of the data packet was successfully decoded.

18. The method of claim 17, wherein:
receiving the indication that the retransmission of the data packet was successfully decoded indicates that the retransmission of the data packet was received in the single BWP; and transmitting the subsequent data transmission in the single BWP is based at least in part on the received indication that the retransmission of the data packet was successfully decoded.

19. The method of claim 18, wherein the single BWP is the first BWP.

20. The method of claim 18, further comprising: transmitting an indication to the UE indicating that the single BWP is to be used for the subsequent data transmission.

21. The method of claim 18, wherein the single BWP is a single one of the one or more second BWPs.

22. The method of claim 14, further comprising: transmitting an indication that the first BWP is to be used for receiving the data transmission.

23. The method of claim 14, wherein the one or more second BWPs are non-overlapping with the first BWP in the frequency domain.

24. The method of claim 14, wherein:
transmitting the data packet in the first BWP comprises transmitting the data packet in the first BWP using a first transmit and receive point (TRP); and
retransmitting the data packet in the one or more second BWPs comprises retransmitting the data packet in the one or more second BWPs using a second TRP that is different than the first TRP based at least in part on the indication that the data packet was unsuccessfully decoded.

25. The method of claim 14, wherein the first BWP and each of the one or more second BWPs are associated with the same transmission time interval (TTI) durations.

26. An apparatus for wireless communications, comprising:
a processor;
memory in electronic communication with the processor; and
instructions stored in the memory and executable by the processor to cause the apparatus to:
receive, from a base station, one or more configuration messages indicating a configuration for each of a plurality of bandwidth parts (BWPs) within a same carrier including a first BWP and one or more second BWPs;
monitor the first BWP and no other BWPs of the plurality of BWPs, the first BWP having a first receiver bandwidth for downlink transmissions from the base station;
receive, from the base station, a data transmission in the first receiver bandwidth based on the monitoring of the first BWP;
determine that a data packet of the data transmission was unsuccessfully decoded;
transmit, to the base station, an indication that the data packet was unsuccessfully decoded based on the determining that the data packet was unsuccessfully decoded;
switch, based at least in part on the determining that the data packet was unsuccessfully decoded, from monitoring the first BWP to monitoring the one or more second BWPs within the carrier, the one or more monitored second BWPs having a total receiver bandwidth that is wider than the first receiver bandwidth; and
receive a retransmission of the data packet in one or more of the one or more monitored second BWPs based on the monitoring of the one or more second BWPs.

27. The apparatus of claim 26, wherein the instructions are further executable by the processor to cause the apparatus to:
receive a configuration message designating the one or more second BWPs or the total receiver bandwidth for retransmissions of data, wherein the switching to monitor the one or more second BWPs is based at least in part on the configuration message designating the one or more second BWPs or the second receiver bandwidth for retransmissions of data.

28. The apparatus of claim 26, wherein the first BWP and each of the one or more second BWPs are associated with the same transmission time interval (TTI) durations.

29. An apparatus for wireless communications, comprising:
a processor;
memory in electronic communication with the processor; and
instructions stored in the memory and executable by the processor to cause the apparatus to:
transmit, to a user equipment (UE), one or more configuration messages indicating a configuration for each of a plurality of bandwidth parts (BWPs) within a same carrier including a first BWP and one or more second BWPs;
transmit a data packet to the UE in the first BWP and no other BWPs of the plurality of BWPs, the first BWP having a first receiver bandwidth;
receive, from the UE, an indication that the data packet was unsuccessfully decoded by the UE; and
retransmit the data packet to the UE, based at least in part on the indication that the data packet was unsuccessfully decoded, in the one or more second BWPs within the carrier, the one or more second BWPs having a total receiver bandwidth that is wider than the first receiver bandwidth.

30. The apparatus of claim 29, wherein the instructions are further executable by the processor to cause the apparatus to:
transmit a configuration message to the UE designating the one or more second BWPs or the total receiver bandwidth for retransmissions of data.

31. The apparatus of claim 29, wherein the first BWP and each of the one or more second BWPs are associated with the same transmission time interval (TTI) durations.

* * * * *